US008359887B2

(12) United States Patent
Bisson et al.

(10) Patent No.: US 8,359,887 B2
(45) Date of Patent: Jan. 29, 2013

(54) APPARATUS AND METHOD FOR PRODUCING SHEETS OF GLASS PRESENTING AT LEAST ONE FACE OF VERY HIGH SURFACE QUALITY

(75) Inventors: Antoine Bisson, Montigny Lencoup (FR); Allan Mark Fredholm, Hericy (FR)

(73) Assignee: Corning Incorporated, Corning, NY (US)

( * ) Notice: Subject to any disclaimer, the term of this patent is extended or adjusted under 35 U.S.C. 154(b) by 209 days.

(21) Appl. No.: 12/742,347

(22) PCT Filed: Nov. 20, 2008

(86) PCT No.: PCT/US2008/012960
§ 371 (c)(1),
(2), (4) Date: May 11, 2010

(87) PCT Pub. No.: WO2009/070236
PCT Pub. Date: Jun. 4, 2009

(65) Prior Publication Data
US 2010/0281921 A1    Nov. 11, 2010

(30) Foreign Application Priority Data

Nov. 29, 2007 (EP) .................................... 07301602

(51) Int. Cl.
*C03B 17/06* (2006.01)
(52) U.S. Cl. .................... 65/101; 65/90; 65/98; 65/253; 65/254
(58) Field of Classification Search ................... 65/101, 65/253
See application file for complete search history.

(56) References Cited

U.S. PATENT DOCUMENTS
2004/0093900 A1 *  5/2004  Fredholm ................... 65/25.3

FOREIGN PATENT DOCUMENTS
WO    WO 2007014066 A2 *  2/2007

* cited by examiner

*Primary Examiner* — Matthew Daniels
*Assistant Examiner* — Cynthia Szewczyk
(74) *Attorney, Agent, or Firm* — Bruce P. Watson

(57) ABSTRACT

A method is disclosed for producing sheet glass having two faces, at least one of which has a high surface quality, the method comprising a treatment step wherein a stream of glass is contacted with a forming tool, and wherein a reversible adhesion force exists between the stream of glass and the forming tool after contacting. An apparatus is also disclosed for producing sheet glass according to the disclosed and various other methods of sheet glass manufacture, the apparatus comprising a forming tool having a means for controlling the temperature of at least a portion of the surface thereof.

19 Claims, 14 Drawing Sheets

APPARATUS AND METHOD FOR PRODUCING SHEETS OF GLASS PRESENTING AT LEAST ONE FACE OF VERY HIGH SURFACE QUALITY

RELATED APPLICATIONS

This application claims the benefit of priority under 35 U.S.C. §365 of International Patent Application Serial No. PCT/US2008/012960 filed on Nov. 20, 2008 designating the United States of America and the benefit of priority to under 35 U.S.C. §119 of European Patent Application Serial No. 07301602 filed Nov. 29, 2007, the entire contents of which are hereby incorporated by reference.

BACKGROUND OF THE INVENTION

1. Field of the Invention

The present invention relates to an apparatus and a method for producing sheets of glass. In particular, the sheets of glass have two faces, at least one which presents a high-quality surface.

2. Technical Background

A number of processes have been developed for fabricating glass sheets having highly smooth surfaces, such as can be used in, for example, computer display and television monitor applications. In one such method, the overflow downdraw fusion method, two flows of glass are generated by controlled overflow around a refractory isopipe. The two flows are kept in contact with the isopipe and are reunited at the root, or bottom tip, of the isopipe to form a sheet of semisolid glass. The two faces of the sheet of glass, thus, never come in contact with any surface that could damage or impart imperfections to the glass surface.

The speed of travel of the sheet of glass is determined by margin wheels and/or pulling rolls that act on the sheet at its margins. Such pulling rolls can help control movement of the glass sheet, apply tension to the glass sheet, and control the thickness of the glass sheet. Physical contact, for example, between the glass surface and a pulling roll, can damages the portion of the sheet in contact with the pulling roll, requiring subsequent removal of the margin portion of the glass sheets.

The fusion method is capable of producing sheets of glass presenting exceptional surface quality in terms of smoothness, thickness, and flatness or planarity. This method is commonly used to fabricate the sheets required for manufacturing flat screens based on light-emitting diodes (LEDs).

Nevertheless, the fusion method is not suitable for all types of glass compositions. For example, glass flow with the fusion method is controllable only if the flow of glass in contact with the isopipe, and more particularly only if the glass in contact with the bottom portion of the isopipe is maintained at a level of viscosity that is sufficiently high. If viscosity of the glass composition is lower than a threshold value, gravity forces can dominate over the viscosity forces and it can become difficult and/or impossible to appropriately tension the flow of semisolid glass leaving the root of the isopipe. In such a scenario, the flow of glass can become mechanically unstable and can generate a sheet of glass of poor quality having, for example variations in thickness and/or distortions. In view of mechanical stability, the fusion method conventionally requires a glass composition having a liquidus viscosity greater than about 10,000 pascal-seconds (Pa·s) (100,000 poises). Unfortunately, this raises a problem with glasses having a liquidus viscosity lower than this threshold. Such glasses, when in contact with the isopipe, can develop crystals at their interface with the isopipe, rendering glass sheets produced therefrom unsuitable for use in the demanding applications described herein.

Thus, there is a need to address the aforementioned problems and other shortcomings associated with the traditional fusion method for manufacture of glass sheets. These needs and other needs are satisfied by the methods of manufacture of the present invention.

SUMMARY OF THE INVENTION

The present invention relates to a method for producing glass sheets having two faces, at least one of which has a high surface quality. The present invention addresses at least a portion of the problems described above through the use of a novel method and apparatus that can, for example, apply a controllable and reversible adhesive force between a molten glass and a forming tool.

In a first embodiment, the present invention provides a method for producing sheets of glass having two faces with at least one of said faces presenting a high surface quality, the method comprising: (a) delivering a stream of glass having a viscosity in the range of about 100 poises to 10,000 poises, said stream of glass having a first and second face, each face is free from making contact with any surface and thus possibly being destabilized mechanically; (b) treating said delivered stream of glass prior to destabilization by putting a first face into contact with a surface of a treatment device or mechanism suitable, temporarily, to support the weight of said glass and for accompanying the falling movement of said glass while increasing glass viscosity and maintaining at least a central strip of said second face free from any contact with any surface, wherein, after the first face is contacted with the surface, a reversible adhesion force exists between the stream of glass and the surface that is sufficient to prevent a slippage of the stream of glass with respect to the surface; (c) using a device or mechanism for controlling glass travel speed to act on the delivered stream after treating, at a suitable distance downstream to provide a sheet of glass; and (d) cooling said sheet of glass.

Additional embodiments and advantages of the invention will be set forth, in part, in the detailed description and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate several embodiments described below. Like numbers represent the same elements throughout the figures.

DETAILED DESCRIPTION OF THE INVENTION

Figure 1:
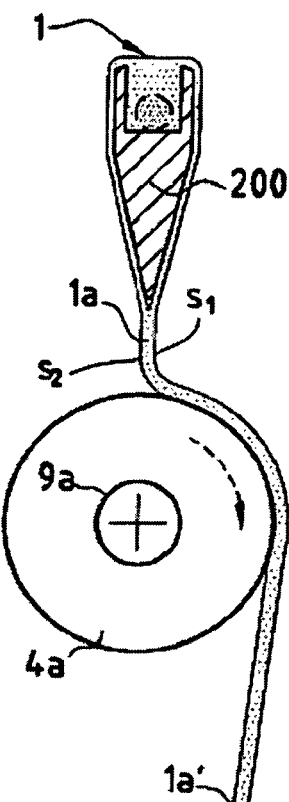
FIG. 1 is a section view of apparatus of the invention within which the method of the invention including delivery of a single stream of glass is implemented.
Figure 1:
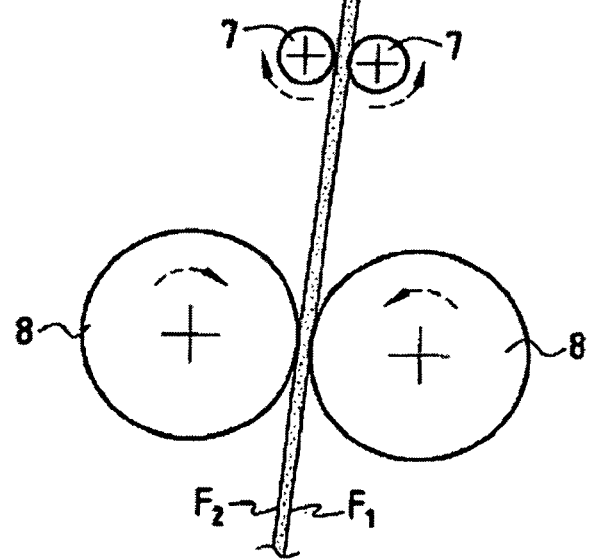

The present invention can be understood more readily by reference to the following detailed description, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its currently known embodiments. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "compound" includes embodiments having two or more such compounds, unless the context clearly indicates otherwise.

"Optional" or "optionally" means that the subsequently described event or circumstance can or cannot occur, and that the description includes instances where the event or circumstance occurs and instances where it does not. For example, the phrase "optionally substituted component" means that the component can or can not be substituted and that the description includes both unsubstituted and substituted embodiments of the invention.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

The following US patents and published applications describe various compositions and methods for processes for producing glass sheets, and they are hereby incorporated by reference in their entirety and for the specific purpose of disclosing glass manufacturing methods, such as, for example the overflow downdraw fusion process: U.S. Pat. Nos. 3,149,949 and 3,338,696.

As briefly introduced above, the present invention provides a method for producing sheets of glass having two faces, wherein at least one of the faces presents high surface quality. The present invention provides various methods to produce sheet glass, each method comprising one or more steps. It is intended that all variations and combinations of each of the one or more recited steps are part of the present invention. Accordingly, the present invention is not intended to be limited to any particular steps and/or sequence of steps, unless specifically denoted otherwise.

Method for Producing Sheet Glass Having High Surface Quality

In one embodiment, the present invention provides a method of producing sheets of glass having two faces, at least one of which presents high surface quality, the method being particularly adapted, although not restricted, to performing such production on the basis of glasses having a low liquidus viscosity, such as, for example, glass having a liquidus viscosity lower than about 20,000 Pa·s. In a characteristic manner, the method can comprise delivering a stream of glass having each of its faces free from making contact with any surface whatsoever and thus being liable to be destabilized mechanically; treating the delivered stream of glass prior to destabilization by putting one of its two faces into contact with a treatment device or mechanism suitable, temporarily, for supporting the weight of the stream of glass and for accompanying a falling movement while increasing viscosity and maintaining at least the central strip of the other one of its two faces free from any contact with any surface whatsoever; using appropriate devices or mechanisms to act on the treated stream at a suitable distance downstream to control its travel speed and also the width and the thickness of the sheet of glass produced; and cooling said sheet of glass that is produced.

In a further embodiment, the method can comprise guiding the treated stream towards the appropriate devices or mechanisms; the guidance being optionally provided while ensuring that at least the central strip of said face of said treated stream that has been kept free from contact with any surface whatsoever during the treatment step continues to be kept free from any such contact. The guidance step can optionally be performed, depending on the viscosity of the stream of glass in question after treatment. In one specific embodiment, a guidance step is performed. In another specific embodiment, no guidance step is performed.

In another embodiment, a stream of glass is generated free from any contact and is taken up rapidly before mechanical destabilization, and its viscosity is increased; the flow is controlled and cooled in order to obtain a sheet of glass having one of its faces that is free from making any contact with any surface whatsoever, at least in its central portion. The surface quality of one of the faces of the resulting sheet depends on this lack of contact.

In yet another embodiment, a flow or stream of glass can be delivered during the first step of the method of the invention. This flow can advantageously have a viscosity in the range 5 Pa·s to 5,000 Pa·s (50 poises to 50,000 poises), for example, about 5, 7, 9, 10, 15, 20, 40, 50, 80, 100, 200, 400, 700, 1,000, 1,500, 2,000, 2,500, 3,000, 3,500, 4,000, 4,500, or 5,000 Pa·s, preferably in the range 10 Pa·s to 1,000 Pa·s (100 poises to 10,000 poises), for example 10, 15, 20, 40, 50, 80, 100, 200, 400, 700, or 1,000 Pa·s. While not intended to be limited to any particular glass or viscosity, the methods of the present invention, in various embodiments, are well-suited for use with glasses having a low liquidus viscosity.

A delivered flow of glass can have, in various embodiments, both faces free from any contact with any surface whatsoever. When delivered in such a way, the glass can fall under gravity. The height through which it can fall is naturally limited, as it must be taken up before it becomes unstable. The acceptable fall height naturally depends on the glass in question. In general it does not exceed 150 millimeters (mm). Advantageously, it is less than 60 mm. Given a particular glass, the person skilled in the art is perfectly capable of optimizing this fall height, i.e. of implementing delivery of said glass. In an exemplary embodiment, the maximum falling height can be about 10 mm for a glass having a viscosity of about 100 Pa·s and a thickness of the delivered stream of about 3 mm.

During the second step of the method of the invention, a delivered stream of glass can be treated. Before it begins to destabilize, the glass stream can be taken up under conditions which naturally do not themselves give rise to destabilization, and which ensure that at least the central strip of one of the faces of the glass remains free from any contact with any surface whatsoever. This face can remain free from or substantially free from contact with another material. Contact, if any occurs, can be limited to the margins of the glass sheet. The stream of glass can be treated, such that at the end of treatment the stream of glass is more viscous than on being delivered upstream, thus stabilizing the glass.

In one embodiment, a treatment of a delivered stream of glass comprises receiving the delivered stream on the surface of a roller, the roller presenting a suitable surface temperature and being set into rotation in a suitable direction and at a suitable speed to accompany the movement of the stream without any relative displacement of the stream relative to the surface of the roller; maintaining contact between the stream and the roller without relative displacement over a significant fraction of the circumference of the roller; the roller being associated with devices or mechanisms for controlling its surface temperature and thus the temperature of the glass in contact therewith, the roller being disposed and driven appropriately to ensure that the contact that is maintained cools the glass sufficiently to obtain the desired increase in viscosity.

In this embodiment, the treated stream of glass can maintain one face free from contact with another surface, such as a margin wheel and/or pulling roll.

As a glass stream contacts a roller, such as a forming roller, an adhesive force can develop between the glass and the roller. The specific nature and magnitude of such an adhesive force can vary, depending upon the composition of the specific glass and the roller, along with such factors as, for example, the surface texture of the roller material, the contact pressure, if any, and duration of contact, and the temperature of the glass and the roller. An adhesive force is the result of Van der Waals type interactions at the glass/roller interface. If the adhesive force is too large, the contacted glass cannot be released or cannot be released without damaging either the glass and/or the roller. If such an adhesive force is too small, the glass stream can slip with respect to the roller, resulting in variations in thickness of and/or damage to the glass sheet.

In various embodiments, the methods of the present invention provide a controllable adhesive force between a roller, such as a forming roller, and a glass stream. Such control, and the target values for example, sheet thickness, can remain constant or can vary during the course of a manufacturing run, and can also provide the improved ability to control, for example, the thickness of a glass sheet. In another embodiment, control of the adhesive force between a glass stream and a roller can provide a possibility of adapting the surface area of the interface between the roller and the glass stream in different directions, as illustrated in FIG. 15C.

Figure 12:
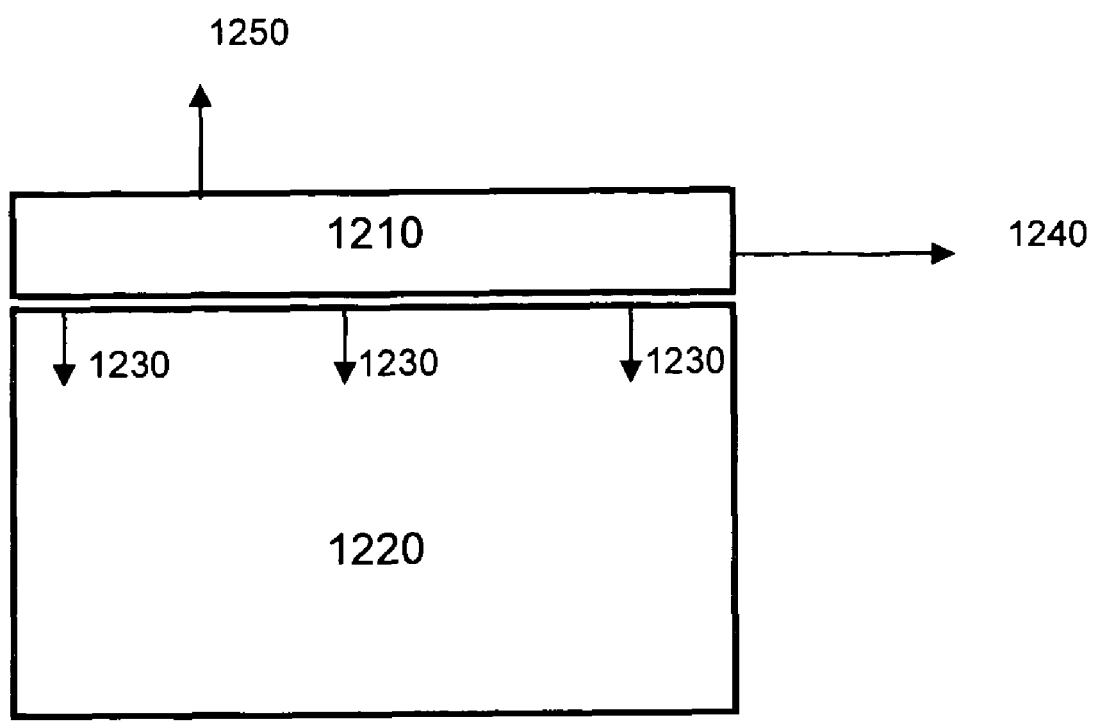
FIG. 12 is a schematic illustration of the adhesive and other forces that can act on a glass stream in contact with a forming roller, in accordance with various embodiments of the present invention.

In another embodiment, the adhesives force between a roller and a glass stream can be utilized to compensate for the natural downward gravity force on the glass during manufacture. The adhesive force between the glass stream and the roller can comprise one or more individual forces acting together, as illustrated in FIG. 12. In addition to the adhesion 1230 of the glass stream 1210 to the surface of a roller 1220, orthogonal 1250 and tangential forces 1240 can act on the glass in the direction of attachment. The adhesive force per unit area can be determined by one of skill in the art, and subsequently utilized to determine the maximum orthogonal and tangential forces to which a glass stream can be subjected without resulting in separation of the glass from the roller. For example, determination of the tangential force can be performed if the static friction coefficient is known.

A relationship exists between the viscosity of a glass stream, for example, contacting a roller, and the adhesive force that can exist between the glass stream and the roller, after contacting. Thus, it can be desirable, in various embodiments, to control the adhesive force by controlling the interfacial temperature between the glass stream and the roller.

The viscosity of a glass stream contacting a roller, such as a forming roller, can vary depending on the compositions and methods employed in a specific design. While not intending to be limiting, the viscosity of a glass stream contacting a roller can be from about $10^8$ Pa·s to about $10^{10}$ Pa·s, for example, about $1 \times 10^8$, $5 \times 10^8$, $1 \times 10^9$, $5 \times 10^9$, or $1 \times 10^{10}$ Pa·s. Glass streams having a viscosity less than about $10^8$ Pa·s can exhibit, in various embodiments, irreversible sticking between the glass stream and the roller. Glass streams having a viscosity of about $10^9$ Pa·s can exhibit, in various embodiments, moderate adhesive forces. Glass streams having a viscosity greater than about $10^{10}$ Pa·s can exhibit no or substantially no adhesive forces between the glass stream and the roller.

Figure 13:
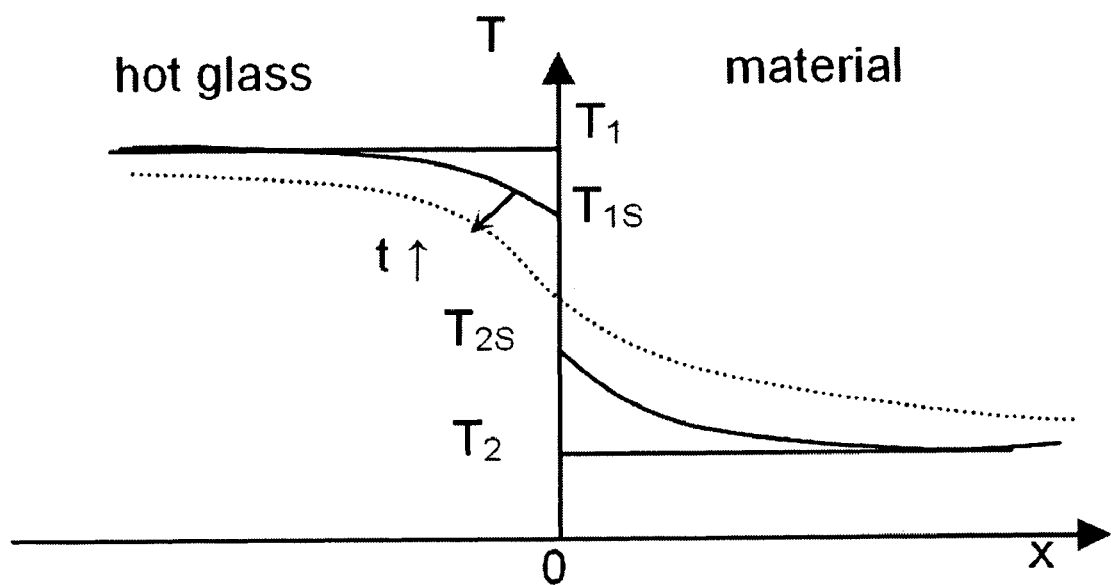
FIG. 13 is a graphical illustration of interfacial temperature for the contact of two semi-infinite media.

The interfacial temperature, and thus the adhesive force between a glass stream and a roller, can be controlled during the manufacturing process. While not wishing to be bound by theory, the interfacial temperature for the contact of two semi-infinite media can generally be expressed by the following equation:

$$\frac{T_{1S}(t) - T_{2S}(t)}{T_1 - T_2} = \exp\left(\frac{t}{\tau}\right) \times \operatorname{erfc}\left(\sqrt{\frac{t}{\tau}}\right) \text{ where } \tau = \left(\frac{b_1 b_2}{h_i(b_1 + b_2)}\right)^2$$

wherein $T_{1s}(t)$ is the temperature of material 1 at the interface over time (t), $h_i$ is the interfacial heat transfer coefficient (W/m²·K) b is $(\lambda \cdot p \cdot cp)^{1/2}$, $\lambda$ is the thermal conductivity of the material (W/m·K), p is the density of the material (kg/m³), cp is the heat capacity of the material (J/kg·K), 1 refers to a first material, and 2 refers to a second material. This relationship can be graphically illustrated as depicted in FIG. 13.

A particular glass manufacturing system, and specifically a roller, such as a forming roller, can utilize any suitable method to control the surface temperature of the roller, and thus, the interfacial temperature and resulting glass viscosity, including, in various embodiments, any one or more of the methods recited herein. In various embodiments, a forming roller can comprise at least one channel within which a cooling fluid, such as, for example air and/or water, can be circulated. A forming roller can optionally utilize other devices and/or mechanisms to control surface temperature in addition to or alternatively to a cooling channel. In a specific embodiment, a forming roller can be hollow, such that forced convection of air and/or water can be sprayed or otherwise applied to the internal wall of the roller. In another specific embodiment, at least one strip of cooling nozzles can be used to control or partially control the surface temperature of a roller. In yet another specific embodiment, thermal control of the roller surface temperature can be effected by, for example, radiation, convection, and/or conduction on at least a portion of the roll not in contact with glass.

Figure 14:
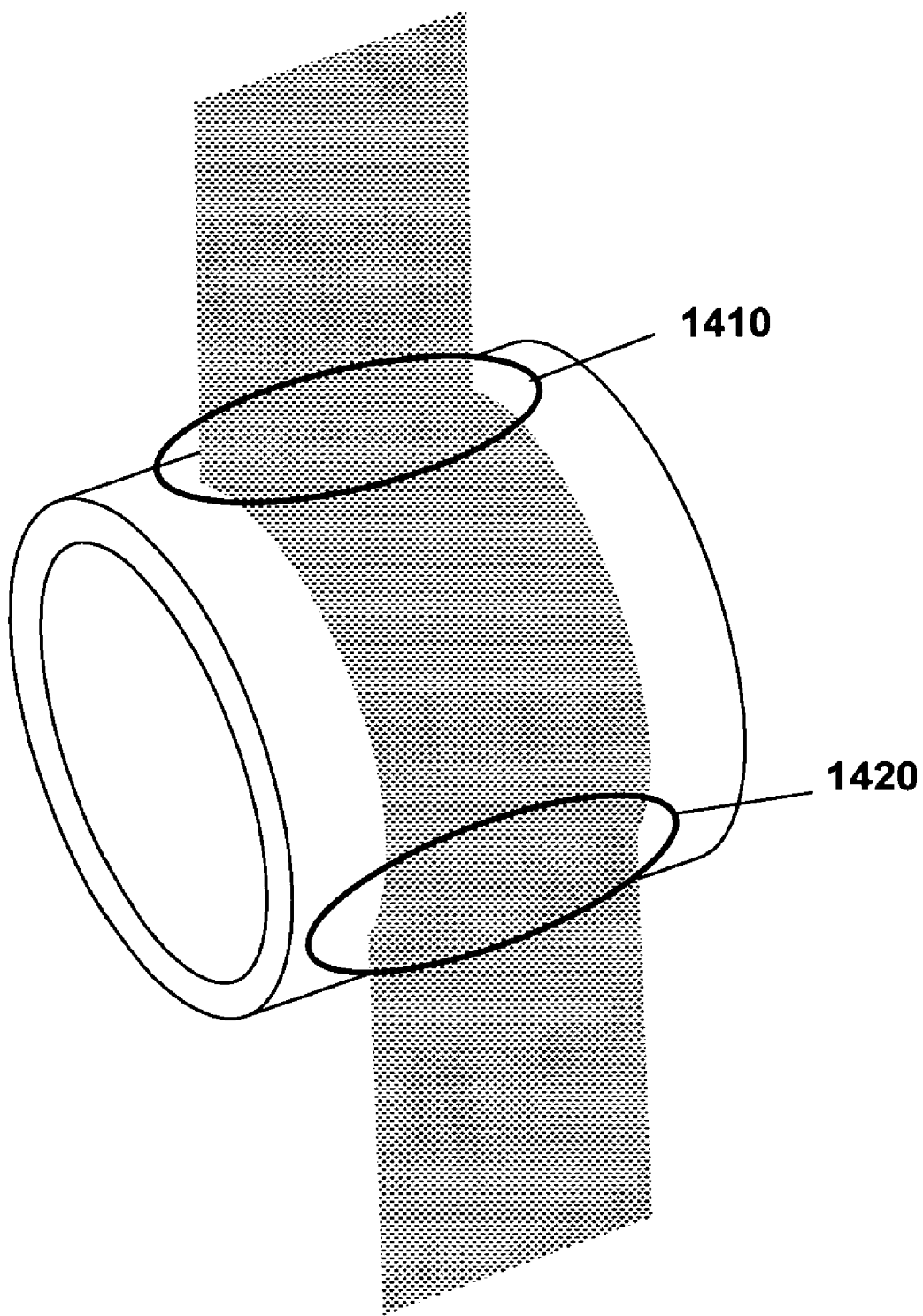
FIG. 14 illustrates the contact area between a forming roller and a glass stream, in accordance with various embodiments of the present invention.

Thus, in various embodiments, the treating or treatment step of the present invention can comprise adjusting and controlling the temperature of a forming tool, such as a roller, prior to and while contacting a glass stream, such that a glass in subsequent contact with the forming tool surface will have a viscosity of from about $10^{9.9}$ poises to about $10^{11.2}$ poises, so as to develop a reversible adhesion between the forming tool and the glass. In one embodiment and with reference to FIG. 14, the adhesion force is reversible over the period extending from where the glass stream contacts the roller 1410 to the point where the glass releases from the contact roller 1420. The treating or treatment step can further optionally comprise maintaining the temperature of the surface so that glass approaching the roller will have a viscosity of from about $10^{9.9}$ poises to about $10^{11.2}$ poises, upon contacting. The treating or treatment step can also further comprise the optional step of maintaining and/or reheating the contacted glass sufficiently such that any subsequent redraw (thinning) can be accomplished.

Figure 15:
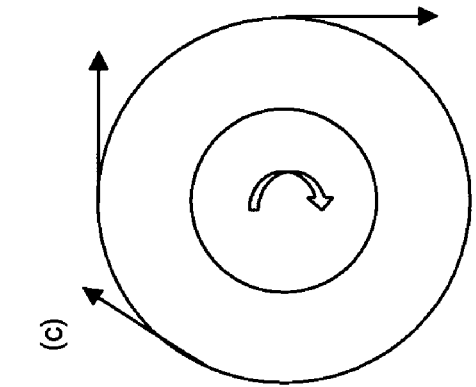
FIG. 15 illustrates various operating configurations of the apparatus and methods of the present invention: (a) location of the beginning of contact and direction of the glass delivery; (b) angular extent of the contact area of glass on the roll; and (c) draw directions.
Figure 15:
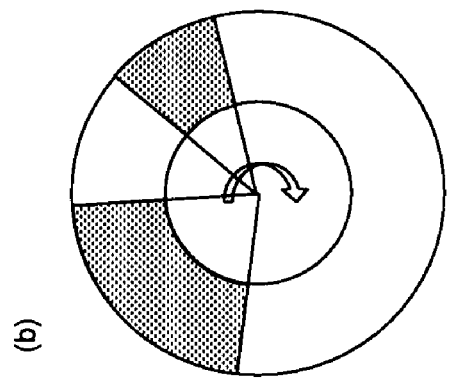
Figure 15:
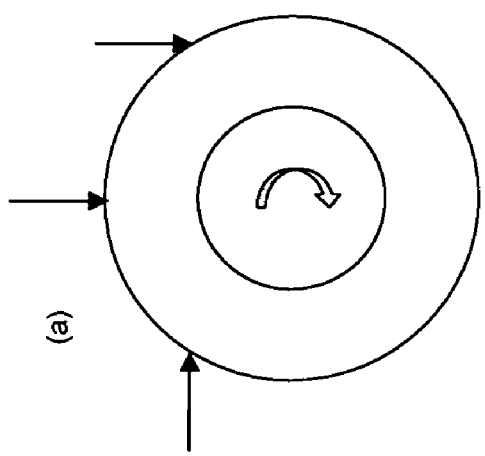

To efficiently stabilize a low liquidus viscosity glass, the drawing force exerted between a roller and glass in contact with the roller can be modified using a variety of techniques. In a first example, the surface area of the interface between a roll and glass in contact with the roll can be modified to, for example, provide modulation of the extent of cooling. In a second example, glass can be delivered to different locations on a roller and/or from different directions. In a third example, a drawing force can be exerted in different directions. Such a configuration can be useful, for example, in a glass production process. FIG. 15 illustrates various exemplary operating conditions for a roller and glass delivery system, in accordance with the present invention. FIG. 15a illustrates various possible locations for initial glass contact with the roller, as well as the direction of glass delivery. FIG. 15b illustrates the angular extent of the contact area (shaded area) of glass on the surface of a roller for glass contacting the roller at various locations. FIG. 15c illustrates exemplary directions from which drawing forces can be exerted. Each of the exemplary techniques described herein and in FIG. 15 can be used independently and/or in combination with any other techniques. It should be noted that the techniques described herein are intended to be exemplary and the present invention is not intended to be limited to such exemplary techniques.

At the end of the second step of the method of the invention, the treated stream of glass can have an increased viscosity. In various embodiment, the increased viscosity of the stream of glass can be in the range of about $10^3$ Pa·s to about $10^6$ Pa·s ($10^4$ poises to $10^7$ poises), for example, about $10^3$, $10^4$, $10^5$, or $10^6$ Pa·s.

A guidance step can optionally be used after the treatment step. Such a guidance step, if utilized, should be designed such that the desired surface quality of the sheet is not impaired. Guidance can be provided without any contact with any surface whatsoever for at least the central strip of the face of the stream in question that is kept free from any contact of this type during the preceding treatment step. Guidance can be advantageously provided such that both surfaces of the stream of glass in question do not make any contact with any surface whatsoever, and such that the final sheet can be free from any contact over the entire surface of one face. Guidance can also be provided using contact that is restricted to the margins of the sheet. In one embodiment, no contact exists with at least one face. In another embodiment, contact limited to the margins of the glass sheet exists on at least one face. Regardless of the specific implementation of an optional guidance step, the central strip of the at least one face of the sheet that remains free from contact during the second step should remain free from any subsequent contact.

Guidance can optionally be provided over a distance of varying length, depending on the specific apparatus used. Guidance, if utilized, can also be provided with a controlled temperature. For example, it can be advantageous in some contexts to further cool the stream of glass in question so as to increase its viscosity.

Such an optional guidance can be provided by a film of gas supporting the stream of glass in question. In one embodiment, guidance is provided by two films of gas, with the stream of glass in question progressing between them. Such a gas film technique can be useful, for example, to generate air cushions beneath the stream of glass, wherein the air cushions carry the stream, and to generate air cushions on both sides of the stream.

In another embodiment, guidance can be provided using margin rollers or wheels. Such rollers or wheels can act on the margins of the treated stream of glass so that the central strip of said stream remains free from any contact. Such rollers or wheels can act in facing pairs on opposite sides of the stream in question.

Downstream from the zone for treating the stream of glass, suitable devices or mechanisms can act on the resulting sheet of glass in a conventional manner to control the travel speed and also the width and thickness of the stream of glass. Such devices or mechanisms can be any suitable design and are generally of two types: a first type acting on the margins of the sheet while it is not cooled or cooled only a little, wherein the margins having surface contact are damaged and are subsequently removed; and a second type further downstream acting on the full width of the cooled and consolidated sheet.

The sheet of glass can then cooled. Any conventional methods and techniques for cooling a formed glass sheet can be used, provided that the glass sheet and/or the at least one face of the glass sheet remain undamaged.

The last steps of the method, driving and cooling the resulting sheet, are conventional.

The method of the invention as described above with reference to a single stream of glass. It is intended that the present invention include such embodiments that include multiple streams of glass, and specifically an embodiment comprising a second stream of glass, wherein the two streams of glass in question are contacted and/or welded together.

In one embodiment, the method of the present invention is utilized with a single stream of glass. In another embodiment, the method of the present invention is utilized with two streams of glass that are welded together. If only a single stream of glass is involved, the resulting sheet presents high surface quality on one face or on at least the central strip of one face.

When two streams of glass are utilized, the resulting sheet can present high surface quality on both faces or on at least the central strip of each of its two faces. In a preferred embodiment, two streams of glass are utilized and the resulting sheet presents high surface quality on both faces or on at least the central strip of each of the two faces of the sheet. In an embodiment comprising two streams of glass, it is also possible to use the invention to produce sheets of glass which present high surface quality on one face or on at least the central strip of the one face. In such an embodiment, the opposing face of the resulting sheet can optionally comprise a pattern or imprint.

Thus, the method of the invention as described above can further comprise: delivering a second stream of glass compatible with the first stream; said second stream of glass having both of its faces free from contact with any surface whatsoever and thus being liable to be destabilized mechanically; treating said second delivered stream of glass prior to destabilization in order to stabilize it mechanically and increase its viscosity; guiding the first and second treated streams of glass towards a junction zone; said guidance of said first treated stream being provided while ensuring that at least the central strip of the face of said first treated stream that has been kept free from making contact with any surface whatsoever during the prior treatment step continues to be kept free from any such contact; joining said first and second treated and guided streams; the streams being joined via the face of said first treated stream that has come into contact upstream with said treatment devices or mechanisms, while said other face of said first treated stream remains free from or substantially free from any contact with any surface whatsoever; it being understood that the action of devices or mechanisms suitable for controlling the travel speed and the width and the thickness of the sheet of glass that is produced is applied to said two joined-together streams.

During the first step of this variant implementation, two flows or streams of glass are delivered, each having a viscosity in the range of about 5 Pa·s to about 5000 Pa·s (50 poises to 50,000 poises), for example, about 5, 10, 20, 40, 50, 80, 100, 200, 250, 300, 350, 500, 700, 900, 1,000, 1,500, 2,000, 2,500, 3,000, 4,000, or 5,000 Pa·s; or preferably in the range of about 10 Pa·s to about 1,000 Pa·s (100 poises to 10,000 poises), for example, about 10, 20, 40, 50, 80, 100, 200, 250, 300, 350, 500, 700, 900, or 1,000 Pa·s. As explained in the introduction to the present specification, the method of the invention has been developed most particularly with reference to glasses having a low liquidus viscosity, but is intended to cover any glasses suitable for use with the present methods.

In a further embodiment, the two flows of glass can have the same or varying viscosities. In a specific embodiment, both flows of glass have the same or substantially the same viscosity. In a preferred embodiment, the two streams of glass have viscosity values that render them suitable for welding together.

The two flows of glass, if utilized, can be delivered from a single source or from two distinct sources, in which case the glass in each flow can be identical or different. If the two flows of glass are delivered from distinct sources, it is preferred that the flows are compatible.

The first stream of glass can be delivered, treated as described herein, and then joined to the second stream under conditions such that one of the two faces remains free from or substantially free from any contact with any surface whatsoever. Similarly, the second stream of glass can be suitable for being treated, guided, and then joined to the first stream under conditions that can be different or identical than those used for the delivery, treatment, and guidance of the first stream.

Thus, treatment can be implemented under conditions which affect the surface state of both of faces. The treatment of the second delivered stream of glass can comprise rolling, implemented with or without an imprint being transferred. In a specific embodiment, an imprint and/or pattern is transferred. It is then possible to obtain a sheet of glass presenting said pattern in one face and high surface quality on the other face. Upstream and downstream from the treatment (rolling), the second stream of glass can behave in the same manner as the first.

The treatment of the second stream of glass can be performed under conditions that affect the surface state of only one of its faces, preferably the face that is to be contacted with and/or welded to the first stream of glass. Such a technique can provide a sheet of glass presenting high surface quality on both faces.

In a preferable embodiment, the method of the invention comprises delivering two compatible streams of glass; each having both faces free from any contact with any surface whatsoever and thus being liable to be destabilized mechanically; independently treating the two delivered streams prior to destabilization, by, for example, putting one of the faces of each stream into contact with a treatment device or mechanism suitable, at least temporarily, for supporting the weight of the streams and accompanying their falling movement, while increasing the respective viscosities of the streams and maintaining at least the central strip of the face of each stream not in contact with a treatment device or mechanism as free from contact with any surface whatsoever; guiding both of the two treated streams towards a junction zone; the guidance being provided while ensuring that at least the central strip of the face of each of the two treated streams that is kept free from contact with any surface whatsoever during the preceding treatment step continues to be kept free from any such contact; joining together the two treated streams via their faces that have come into contact with the treatment devices or mechanisms upstream; the other one of their faces remaining free from or substantially free from any contact with any surface whatsoever; acting on said two joined-together treated streams with devices or mechanisms suitable for controlling the travel speed and also the width and the thickness of the sheet of glass that is produced; and cooling the sheet of glass.

In this preferable embodiment, in which the treatment of the second stream affects only the surface of a face that is to be contacted with and/or welded to the first stream, a sheet of glass having both faces presenting high surface quality can be produced.

The first step of delivering two streams or flows of glass that are compatible is described in detail above. Each of the two delivered flows of glass can have both faces completely free of any contact with any surface whatsoever. The flows can be delivered in a way so as to fall freely. The height of the fall can be naturally limited, as the delivered flows preferably need to be taken up before the flows become destabilized. The height of the fall that is acceptable naturally can vary depending upon the specific glass composition. While not wishing to be limited, the natural fall height is typically 150 mm or less. In a preferable embodiment, the natural fall height is about 60 mm. One of skill in the art could readily determine an appropriate fall height for a particular glass composition.

In continuance of this preferable embodiment, during the second step of the method of the invention, both of the streams of glass are treated. The two streams of glass can be taken up prior to any destabilization under conditions which naturally do not themselves lead to destabilization, but which can ensure that at least the central strip of one face of each stream remains free from or substantially free from any contact with any surface whatsoever (the face in question remains completely untouched or, in any event is touched only on its margins), and which give rise to an increase in viscosity. The two streams of glass can be treated together or independently of each other. Further, in various embodiments, the two streams can be subjected to the same or different treatments.

In one embodiment, each of the two streams is subjected to a different treatment. In a preferred embodiment, the two streams are subjected to the same or substantially the same treatment. The treatment step of this preferred embodiment is intended to include the steps of adjusting the forming tool (e.g. roller) temperature and/or maintaining the surface temperature of the forming tool as described herein with respect to a single glass stream method, so as to control viscosity and thus, adhesive forces between the glass stream(s) and the forming tool.

Thus, in various embodiments, the treating or treatment step of the present invention can comprise adjusting the temperature of each of the one or more forming tools, such as rollers, prior to contacting the one or more glass streams, such that glass in subsequent contact with a forming tool surface will have a viscosity of from about $10^{9.9}$ poises to about $10^{11.2}$ poises, so as to develop a reversible adhesion between the forming tool and the glass. The treating or treatment step can further optionally comprise maintaining the temperature of the surface of the one or more forming tools so that glass approaching the roller will have a viscosity of from about $10^{9.9}$ poises to about $10^{11.2}$ poises, upon contacting or a period of time thereafter. The treating or treatment step can also further comprise the optional step of maintaining and/or reheating the contacted glass sufficiently such that any subsequent redraw (thinning) can be accomplished.

After treatment, the streams of glass can be more viscous than they were, for example, during delivery, upstream. Such an increase in viscosity can stabilize a glass stream.

An increase in viscosity from a treatment step can be of any suitable magnitude and can comprise one or multiple individual treatments that impart incremental increases in viscosity. In one embodiment, the two streams of glass, after treatment, have the same or substantially the same viscosities. In another embodiment, the two streams of glass, after treatment, can have different viscosities. One of skill in the art could readily determine an appropriate treatment and an appropriate target viscosity for one or both, if multiple glass streams are present, streams of glass. The person skilled in the art is well aware that it is quite possible to weld together glasses of viscosities that are relatively different. In other technical fields, and in particular in optical instruments, glasses are welded together in which the ratio of viscosities can have a value as high as 3 at the welding temperature.

In various embodiments, the treatment of either one or, preferably both, of the two delivered streams comprises receiving the (or each of said two) delivered stream(s) on the surface of a "forming" roller presenting a suitable surface temperature and being set into rotation in an appropriate speed and direction to ensure that it accompanies the movement of the stream in question without relative displacement between the stream and the surface of the roller in question; maintaining contact between the stream and the roller without relative displacement over a significant fraction of the circumference of the roller in question; the roller(s) being associated with devices or mechanisms for controlling surface temperature and thus temperature of the glass in contact therewith, and preferably being fitted with such devices or mechanisms, the roller(s) being located and entrained suitably in such a manner that the contact that is maintained causes the glass to cool down sufficiently to achieve the desired increase of viscosity.

In the context of this preferred embodiment, each of the treated streams of glass conserves one face each that is free from any contact.

As means, devices or mechanisms, suitable for controlling surface temperature, the structure of the forming rollers can, in various embodiments, include channels suitable for carrying a circulating cooling fluid, such as, for example, air and/or water. In other embodiments, a means for controlling the surface temperature of the forming rollers can be located outside the structure of the rollers, such as, for example, by utilizing at least one strip of cooling nozzles.

As means, devices or mechanisms, suitable for controlling surface temperature, the structure of the forming rollers can, in various embodiments include any suitable method to control the surface temperature of the roller, and thus, the interfacial temperature and resulting glass viscosity, including, in various embodiments, any one or more of the methods recited herein. In various embodiments, a forming roller can comprise at least one channel within which a cooling fluid, such as, for example air and/or water, can be circulated. A forming roller can optionally utilize other devices and/or mechanisms to control surface temperature in addition to or alternatively to a cooling channel. In a specific embodiment, a forming roller can be hollow, such that forced convection of air and/or water can be sprayed or otherwise applied to the internal wall of the roller. In another specific embodiment, at least one strip of cooling nozzles can be used to control or partially control the surface temperature of a roller. In yet another specific embodiment, thermal control of the roller surface temperature can be effected by, for example, radiation, convection, and/or conduction on at least a portion of the roll not in contact with glass.

At the end of the second step, the treated streams can have an increased viscosity. In one embodiment, the viscosity, after treatment, can be significantly increased. In various embodiments, the of the treated streams can be in the range of about $10^3$ Pa·s to about $10^6$ Pa·s, for example, about $10^3$, $10^4$, $10^5$, or $10^6$ Pa·s ($10^4$ poises to $10^7$ poises).

The treated streams of glass can then be contacted and/or welded together to generate a sheet of glass. The contacting and/or welding step can comprise any suitable technique for joining glass compositions or articles. The contacting and/or welding technique should ideally be performed such that the faces of the respective sheets that have contacted another surface during the second step of the method are joined, and thus, the faces of the sheet of glass that results from the contacting and/or welding technique are constituted by the outside faces of the two streams of glass that are free of or substantially free of any contact.

Prior to contacting and/or welding the streams of treated glass, each of the streams can optionally be guided towards a joining zone. This guidance stage, if performed, must naturally avoid spoiling the desired surface quality of the final sheet. Guidance can be provided without any contact being made with any surface whatsoever by at least the central strips of the faces of both of said two streams in question that have been kept free of any contact of this type during the preceding treatment step. Guidance can preferably be provided without either of the two faces of each of the sheets in question making contact with any surface whatsoever, so that the faces of the final sheet can be obtained free from any contact over their entire area. Alternatively, guidance can be obtained while restricting contact to the margins only of each of the two sheets. Whatever the particular way in which this guidance is implemented, the central strip of the face of each of the two sheets that has remained free from contact during the second step of treatment can continue to remain free from or substantially free from any contact.

Guidance can be provided over any suitable distance for a specific glass manufacturing system. Such guidance, if performed, can, in various embodiments, be a longer or shorter distance and is preferably provided under temperature control. In one embodiment, it is preferable to further cool the streams of glass in question in order to increase their viscosity. In other contexts, it is preferable to heat the streams of glass in preparation for welding them together.

Such guidance can be provided by a film of gas supporting the stream of glass in question. In a preferred embodiment, two films of gas can be provided, with each stream of glass in question progressing between them. It is preferable to generate cushions of air beneath each of the streams of glass (i.e. air cushions carrying the streams), and even more preferable to generate cushions of air on both sides of each of the streams. Such a guidance technique can avoid any contact between a stream of glass and another surface.

In yet another embodiment, a guidance step, if performed, can make use of margin rollers or wheels. Such rollers or wheels can act on the margins of the treated stream of glass so that the central strip of each stream remains free from or substantially free from any contact. Such rollers or wheels can act in pairs, being disposed facing each other on opposite sides of the stream in question.

In one embodiment, both streams of treated glass can be guided using the same type of guidance technique, for example, using at least one film of gas or using margin rollers or wheels.

The two streams of glass can then be joined together, for example, while they are at a viscosity in the range of about $2\times10^3$ Pa·s to $10^7$ Pa·s, for example, about $2\times10^3$, $5\times10^3$, $8\times10^3$, $10^4$, $10^5$, $10^6$, or $10^7$ Pa·s ($2\times10^4$ poises to $10^8$ poises).

The streams of glass can be joined together using any suitable technique, such as, for example, using devices or mechanisms of the same type as those used upstream of the welding zone.

Downstream from the zone where the two streams of glass are joined together, appropriate devices or mechanisms can be used in a conventional manner on the resulting sheet of glass to control, for example, the travel speed of the sheet and also to control the width and thickness of the sheet. In general, such means, devices or mechanisms, can be of two types: a first type acting on the margins of the sheet that has not been cooled or that has been cooled relatively little (the margins contacted in this way are thus damaged and subsequently eliminated); and of a second type which takes place further downstream over the entire width of the cooled and consolidated sheet. The sheet of glass is thus cooled.

These later steps of the method, i.e. driving and cooling of the sheet produced by joining together the two streams, are in principle and can be implemented in practice in a manner that is entirely similar to the same later steps in the fusion method.

The details recited herein concerning the guidance and joining steps, such as for the preferred embodiment for obtaining a sheet of glass presenting high quality surface on both faces, can also be applied to other embodiments, such as, for example: to an embodiment wherein the second stream of glass is rolled; to an embodiment wherein the second face of the second stream is subjected to contact during treatment; or to any of the other embodiment described herein, and specifically to the following embodiments.

In one embodiment, provision can be made for transferring a pattern onto at least one of the two treated streams prior to joining the streams together. The face that is free from or substantially free from any contact during the treatment and guidance of the stream in question is thus marked with a pattern. In this embodiment, and in contrast to other embodiments recited herein, the face marked with a pattern is the face that is to constitute one of the faces of the final sheet and not the face that is to be contacted and/or welded to the other stream of glass.

In a specific embodiment, the method comprises delivering two compatible streams of glass, each having both faces free from any contact with any surface whatsoever and thus being liable to be destabilized mechanically; treating both of the delivered streams independently prior to destabilization: one of the two streams being treated by putting one of its two faces into contact with treatment means suitable for temporarily supporting its weight and for accompanying its falling movement while increasing its viscosity and while maintaining at least the central strip of the other one of its faces free from contact with any surface whatsoever; while the other one of the two streams is treated by putting one of its two faces into contact with treatment means suitable, temporarily, for supporting its weight and for accompanying its falling movement, while increasing its viscosity and while subjecting the other one of its two faces to the action of other devices or mechanisms which, co-operating with the treatment devices or mechanisms, serve to transfer an imprint onto the other one of its two faces; guiding both of the two treated streams towards a junction zone, while ensuring that at least the central strip of the face of the treated stream that is kept free from or substantially free from any contact with any surface whatsoever during the preceding treatment step continues to be kept free from any such contact, and while also ensuring that at least the central strip of the face of the other treated stream onto which an imprint has been transferred is also not put into contact with any surface whatsoever; joining the two treated streams together via their faces which have come into contact with the treatment devices or mechanisms upstream; at least the other face of the treated stream which does not have an imprint remaining free from or substantially free from any contact with any surface whatsoever; acting on the joined-together treated streams by devices or mechanisms suitable for controlling the travel speed and the width and the thickness of the sheet of glass that is produced; and cooling the sheet of glass.

In this specific embodiment, a pattern can be transferred onto the face of one of the two streams, for example, while the stream is being treated, which face is a priori intended to be made with a central strip that is free from any contact with any surface whatsoever. It is thus possible to locally modify the preferred embodiment of the invention.

Apparatus for Producing Sheet Glass

The present invention also provides an apparatus for producing sheets of glass having two faces, with at least one of the faces presenting high surface quality, and preferably both of the faces presenting high surface quality. The apparatus can be suitable for using the methods recited herein, and for using all of the various embodiments described herein and intended to be part of the invention.

The apparatus of the invention comprises, from upstream to downstream (relative to the travel direction of the stream of glass: a single stream of glass for use in a basic apparatus restricted to the means, devices or mechanisms, listed below; such basic apparatus being suitable for being associated, or indeed merely duplicated in order to process two streams that are to be welded together):

a delivery means, device or mechanism, for delivering a stream of glass under conditions in which the stream of glass has both of its two faces free from any contact with any surface whatsoever;

a treatment means, devices or mechanisms, for treating the delivered stream of glass, the treatment means being suitable for being put into contact with one of its two faces and for supporting the weight of the stream temporarily while accompanying its falling movement and increasing its viscosity and while maintaining at least the central strip of the other one of its two faces free from any contact with any surface whatsoever; the relative disposition of the delivery means, devices or mechanisms, and the treatment means being compatible with the mechanical stability of the delivered stream; devices or mechanisms located at a suitable position downstream for controlling the travel speed and also the width and the thickness of the sheet of glass that is produced; and devices or mechanisms for cooling the sheet of glass that is produced.

The apparatus of the present invention can, in various embodiments, further comprise one or more guidance devices or mechanisms for guiding the treated stream; the guidance devices or mechanisms acting upstream from the devices or mechanisms for controlling the travel speed, width, and thickness of the sheet of glass that is produced and performing their guidance function without involving any contact with at least the central strip of the face of the treated stream that has been kept free from any contact with any surface whatsoever by the treatment devices or mechanisms.

The means, devices or mechanisms, in question (delivery means, treatment means, guidance means, control means, and cooling means) can exist in various embodiments and can be arranged in different variants, and the present invention is not intended to be limited to any particular combination and/or arrangement of means, devices, and/or mechanisms.

The means, devices or mechanisms for delivering a glass stream can be a portion of a conventional delivery system, for example, an isopipe or casting device.

As described herein, the relative disposition of the means for delivering and treating the stream of glass should be compatible with the stream retaining mechanical stability. As already specified, with reference to the method of the invention, the free fall height of the one or more streams can be limited. Consequently, the relative disposition of the delivery means and of the treatment means is generally such that the delivered stream remains free from or substantially free from any contact with any surface whatsoever over a typical height of about 150 mm or less, preferably about 60 mm.

The treatment means can also vary. In a preferred embodiment, a treatment means comprises a roller suitable for being rotated and fitted internally with a means for controlling its surface temperature. Such a roller can be referred to as a "forming" roller and can be made out of any suitable material for the particular configuration, apparatus and glass being produced. In one embodiment, a forming roller can comprise, for example, a refractory material, a metal alloy, or a combination thereof. In another embodiment, the forming roller can comprise a stainless steel. In a specific embodiment, a forming roller comprises an alloy comprising at least 15% by weight of nickel. The size and shape of a forming roller can also vary depending upon the specific configuration, apparatus, and glass being produced, and the present invention is not intended to be limited to any particular roller size or shape. In various embodiments, a forming roller can have a diameter in the range of from about 40 mm to about 200 mm, for example, about 40, 50, 60, 70, 80, 100, 120, 140, 160, 180, or 200 mm, and preferably in the range of from about 50 mm to about 120 mm, for example, about 50, 60, 70, 80, 100, or 120 mm. A forming roller can optionally comprise components and/or means to control the temperature of a portion of the forming roller, such as, for example, the external surface. The components and/or means to control the temperature of a portion of the forming roller can be any suitable components and/or means that are compatible with the glass forming methods and techniques described herein, including the specified examples recited below. In one embodiment, a forming roller comprises a fluid circulation circuit, for example, internal to or external to the roller itself. In other various embodiments, a forming roller can comprise a cooling channel, a hollow cavity, one or more cooling nozzles, or a combination thereof, as described with respect to the methods of the present invention.

As described above, the optional guidance of the treated stream of glass is advantageously implemented by means of at least one film of gas. In this context, the means for guiding said stream of treated glass in the apparatus associated with the method preferably comprise at least one wall along which a film of gas can be generated; and more preferably comprise two such walls, one on either side of the path followed by the flowing stream of glass, wherein both deliver a respective film of gas. In a first embodiment, such walls are made of a material having open pores; in a second embodiment, the walls include within their structure artificial passages for delivering gas. Upstream from such walls, whether naturally porous or made porous artificially (open pores), there are generally means for maintaining a gas (nitrogen or air, for example) under pressure. In a preferred embodiment, the walls comprise a porous material, such as, for example, a graphite or a refractory material. Porous walls having pores used for generating a film of gas have already been described in various contexts, and in particular in the following patent documents: JP-B-48 022 977; JP-A-62 283 831; U.S. Pat. No. 1,788,037; U.S. Pat. No. 3,298,808; and U.S. Pat. No. 2,733,225.

It has also been disclosed that the optional guidance of the stream of treated glass can make use of margin rollers or wheels, preferably pairs of such rollers or wheels. The apparatus of the invention can thus comprise such margin rollers or wheels as its guidance means. It has at least two such rollers or wheels, each suitable for acting on one of the two margins of a given face of the stream of glass. As a general rule there are several such couples distributed along the length of the stream. In one embodiment, such apparatus for guiding a stream of glass, for example, two margin rollers, wheels, or a plurality of couples of such rollers or wheels acting on the bottom face of said stream, is associated with apparatus of the same type having rollers or wheels acting opposite the above-mentioned rollers or wheels on the other face of the stream in question. The rollers or wheels placed facing each other are said to be in "pairs" so as to develop their action on opposite sides of the flowing stream of glass.

Regardless of the specific implementation of a guide means, the guide means are preferably suitable for controlling the temperature of the guided stream of glass. It can be preferably, as described above, to cool the guided stream. Thus, the walls along which the stream of glass is guided can contain resistance elements or circuits for circulating fluids.

Downstream from the treatment means, and possibly also downstream from the guidance means, there are means for maintaining the travel speed, the width, and the thickness of the sheet of glass that is produced, and also means for cooling the sheet. These means can comprise means of the same type as those used in the prior art in similar locations. Thus, for the means suitable for controlling the travel speed, width, and thickness, in various embodiments, it can be useful to use margin wheels and/or tractor rollers, to use margin wheels on the sheet where it is not yet cooled or has cooled little, and subsequently, downstream therefrom, it can be useful to use tractor rollers on the sheet that has cooled and been consolidated.

The basic apparatus described herein can be configured to handle one or multiple, for example, two streams of glass. Thus, the apparatus of the invention can further comprise: a delivery means for delivering a second stream of glass under conditions in which the second stream of glass has both of its two faces free from or substantially free from any contact with any surface whatsoever; treatment means for treating the second delivered stream of glass, the treatment means being suitable for mechanically stabilizing the second delivered stream and for increasing its viscosity; the relative disposition of the delivery means and the treatment means being compatible with mechanical stability of the second delivered stream; guidance means for guiding the second treated stream of glass towards a junction zone for joining it with a first treated and guided stream of glass; junction means for putting the first and second treated and guided streams into contact; the first treated stream being put into contact with the second treated stream via its face that has come into contact upstream with the treatment means, its other face remaining free from or substantially free from any contact with any surface whosoever; and the means disposed at a suitable position downstream from the junction zone are suitable for controlling the travel speed and also the width and the thickness of the sheet of glass that is produced by joining together the first and second treated streams.

The means for delivering the two streams of glass in question can consist in a single feed source or in two distinct sources, in particular they can be constituted by: a single receptacle suitable for being fed and for overflowing over two faces, such a receptacle can entirely be similar to a truncated isopipe as disclosed in U.S. Pat. Nos. 3,149,949 and 3,338,696; or a single casting device having two open ends that are distinct and fitted with slots, the width of the slots naturally being adapted to the viscosity of the streams of glass in question; or two isopipes, both being devices of the kind, for example, described in said U.S. Pat. Nos. 3,149,949 and 3,338,696.

The means acting on the first stream in question (the delivery means, the treatment means, the guidance means, the joining means) act under conditions such that one of its two faces remains free from or substantially free from any contact with any surface whatsoever.

The means acting on the second stream in question (the delivery means, the treatment means, the guidance means, the joining means) can be identical with or different from the corresponding means acting on the first of the streams in question.

Thus, the apparatus of the invention can be, in various embodiments, symmetrical to a greater or lesser extent.

In particular, the treatment means can be identical or different. It can comprise means that are advantageously identical, for keeping at least a central strip of one of the faces of the stream in contact therewith completely free from any contact. It is then possible to obtain a sheet having high surface quality on both faces.

For the first stream, these means can comprise means of the roller type as described herein, and for the second stream, means suitable for transferring a pattern onto the face that is to constitute the other face of the final sheet. Thus, the apparatus of the invention is suitable for delivering, treating, and joining together two streams of glass, and can include an additional roller device for treating one of the two streams. The additional roller device can be suitable for imprinting a pattern onto the appropriate face of one of the streams, which face is to constitute one of the faces of the final sheet.

Means suitable for use in dual apparatuses of the invention are described in greater detail below while describing in non-limiting manner further details concerning the variant that covers the preferred embodiment, suitable for delivering a sheet of glass in which both faces present high surface quality.

In a preferred embodiment, the dual apparatus of the invention comprises a delivery means for delivering two streams of glass under conditions in which each of the streams has both of its faces free from any contact with any surface whatsoever; a treatment means for independently treating each of the delivered streams of glass, which treatment means are suitable for being put into contact with one of the two faces of each of the two streams and for supporting the weight of each of the streams temporarily, for accompanying the falling movement of each of the streams while increasing the respective viscosities of each of the two streams and while maintaining at least the central strip of the other one of the two faces of each of the streams free from any contact with any surface whatsoever; the relative disposition of each delivery means and of the treatment means being compatible with mechanical stability of the delivered streams; guidance means for guiding both of the treated streams towards a junction zone; the guidance means performing their function without involving any contact with at least the central strip of the face of each of the treated streams that have been kept free from any contact with any surface whatsoever by the treatment means; a junction means for putting the two treated streams into contact via their faces that have come into contact with the treatment means; their other faces remaining free from or substantially free from any contact with any surface whatsoever; a means for controlling the travel speed and also the width and the thickness of the sheet of glass that is produced; and a means for cooling said sheet of glass that is produced.

Various types of means suitable for delivering two streams of glass are described above. The essential constraints on the relative disposition of the delivery means and of the treatment means are recalled.

The treatment means for each of the two streams are suitable for conserving at least the central strip of said two streams free from any contact. The treatment means can exist in a variety of embodiments. In a preferred variant, they mainly comprise two rollers suitable for being rotated and fitted on the inside with means for controlling their surface temperature. Such rollers, referred to as "forming" rollers, can be made out of refractory material or out of a metal alloy, for example a metal alloy containing at least 15% by weight of nickel. They can have a variety of diameters, generally in the range of from about 40 mm to about 200 mm, for example, about 40, 50, 60, 80, 100, 120, 140, 160, 180, or 200 mm; and preferably in the range of from about 50 mm to about 120 mm, for example, about 50, 60, 80, 100, or 120 mm. A fluid circulation circuit can also be provided within the structure of a roller. In another embodiment, a means can be provided outside the structure of the forming rollers for controlling the surface temperature of the rollers. Such means can be constituted in particular by at least one strip of cooling nozzles.

As mentioned above, the treated streams of glass are advantageously guided using at least one gas film. In this context, the means for guiding the treated streams of glass in the associated apparatus of the method advantageously comprise at least one wall along which a film of gas can be generated (most advantageously, two such walls are provided on opposite sides of the path followed by the stream of glass in question). In a first embodiment, such walls are made of a material having open pores; in a second embodiment, such walls have artificial passages made in their structure for a gas. Upstream from such walls, whether naturally porous or made porous artificially (open porosity), there are generally means for maintaining a gas (nitrogen or air, for example) under pressure.

The first embodiment mentioned above (walls made of porous material, e.g. of the graphite type or of the refractory material type) is preferred. Porous walls having pores used for generating a film of gas have already been described, in various contexts, and in particular in the following patent documents: JP-B-48 022 977; JP-A-62 283 831; U.S. Pat. No. 1,788,037; U.S. Pat. No. 3,298,808; and U.S. Pat. No. 2,733,225.

It has also been shown that the treated streams of glass can be guided by means of margin rollers or wheels, advantageously by pairs of such rollers or wheels. The apparatus of the invention can thus comprise guidance means constituted by such margin rollers or wheels. It has at least two such rollers or wheels each suitable for acting on one of the two margins of the same face of the stream of glass in question. There are thus as a general rule a plurality of couples of wheels or rollers distributed along the length of the stream. Advantageously, such apparatus for guiding a stream of glass (two margin rollers or wheels or a plurality of couples of such rollers or wheels acting on the bottom face of the stream) is associated with apparatus of the same kind in which the rollers or wheels act in register on the opposite face (top face) of the stream in question. The rollers or wheels in question are referred to as being in "pairs" that are arranged to act in register with each other on opposite sides of the flowing stream of glass.

Regardless of the way in which they are embodied, the guidance means are advantageously suitable for controlling the temperature of the guided streams of glass. It can be advantageous for the guided streams to be cooled or for them to be heated. Thus, walls along which the streams of glass are guided can optionally contain heating resistance elements or circuits for circulating fluids.

Concerning the above-described means of the apparatus of the invention that act upstream from the zone in which the two streams are joined together, these means can be identical for both streams. Nevertheless, this is not essential.

In order to join together (weld) the two streams of glass that have been treated and then guided towards their junction line, appropriate conventional means are generally disposed downstream from the junction line. A junction means can be of the same type as the guidance means located upstream. They can thus be constituted in particular by walls along which it is possible to generate a film of gas (such walls are advantageously arranged in line with the guidance walls of the same type, and can even be integral with such guidance walls) or margin rollers or wheels (acting together in couples, advantageously in pairs).

Downstream from the junction means, there are means for maintaining the travel speed, width, and thickness of the sheet of glass that has been produced, and also means for cooling the sheet. These means are advantageously means of the type used in the prior art for equivalent functions. Thus, for the means that control the travel speed, width, and thickness, it is recommended to use margin wheels and/or tractor rollers, advantageously to use margin wheels on the sheet where it has not yet cooled down or has cooled down little, followed, further downstream, by tractor rollers acting on the sheet that has cooled and been consolidated.

Such apparatus of the invention can be completely or somewhat symmetrical, at least in general design, and is suitable for generating two streams of glass, each having one face that is at least partially or completely intact, and for uniting the two streams of glass via their other faces that are polluted so as to produce a sheet of glass having two faces that present high surface quality.

Nevertheless, the apparatus can be modified (as explained above this can be for satisfying a particular requirement) so as to be suitable for transferring a pattern onto one or other of the two faces that would otherwise be obtained in at least a partially intact manner.

This localized modification can be applied downstream from the means for treating the streams in question: thus, in the advantageous variant of the apparatus of the invention recommended above, the apparatus further comprises means for transferring a pattern onto one of the two treated streams in question, which means are disposed upstream from the means for joining the two treated streams together. Such means can be constituted in particular by additional rollers.

The localized modification can also apply in the treatment means which are provided a priori to treat one of the streams while polluting only one of its faces. In such a context, the apparatus of the invention comprises: a delivery means for delivering two streams of compatible glass under conditions in which each of the streams of glass has both of its faces free from any contact with any surface whatsoever; a treatment means for independently treating each of the two delivered streams of glass: the treatment means comprising first means suitable for being put into contact with one of the two faces of one of the two streams and for supporting the weight of the stream temporarily, accompanying its falling movement while increasing its viscosity and maintaining at least the central strip of the other one of the two faces of the stream free from any contact with any surface whatsoever; and second means suitable for being put into contact with one of the two faces of the other one of the two delivered streams and for supporting the weight of the stream temporarily, accompanying its falling movement while increasing its viscosity, and also third means suitable for co-operating with the second means for transferring an imprint onto the other one of the two faces of the other one of the two delivered streams; the relative disposition of the delivery means and the treatment means being compatible with mechanical stability of the delivered streams; a guidance means for guiding each of the two treated streams towards a junction zone; the guidance means performing their action without involving any contact with at least the central strip of the face of the treated stream that has been kept free from any contact with any surface whatsoever by the means involved in its treatment, and also, advantageously, without involving any contact by any surface whatsoever with at least the central strip of the face of the other treated stream on which the third means have acted; a junction means for putting the two treated streams into contact via their faces that have been put into contact, upstream, respectively with the first and second treatment means; the junction means ensuring that at least the other face of the treated stream which does not carry an imprint remains free from or substantially free from any contact with any surface whosoever; a means for controlling the travel speed and also the width and the thickness of the sheet of glass that is produced; and means for cooling the sheet of glass that is produced.

In consideration of the above, a person skilled in the art could readily understand the advantages provided by the present invention.

The glass produced by the various methods of the present invention can be any suitable glass and/or glass-ceramic material having a viscosity as described herein. Further, the methods and apparatus can be used to produce a glass and/or glass-ceramic having one or more layers of conductive oxides, semiconductors, or a combination thereof applied thereto for applications, for example, in the fields of displays and lighting technologies. In a specific embodiment, such sheets of glass can be used in association with light-emitting diode technology.

The apparatus and methods of the present invention can be further described in reference to the accompanying illustrations. FIG. 1 shows a mass 1 of molten glass. The mass is delivered in the form of a stream 1a by a delivery device 200 of the isopipe type. The stream of glass 1a falls freely through a small height prior to being taken up by a forming roller 4a. While falling freely, both faces $s_1$ and $s_2$ of the stream 1a are free from any contact with any surface whatsoever. On being taken up, the face $s_2$ of the stream 1a comes into contact with the outside smooth surface of the forming roller 4a. The roller 4a rotates in a direction and at a speed such as to ensure that there is no relative movement between the roller and the stream in contact with the roller. The roller 4a is used for stabilizing the stream 1a mechanically. The viscosity of the stream 1a is increased mainly by contact between the stream and the roller which implies that the stream will be cooled. This cooling is controlled by controlling the flow rate and the temperature of a cooling fluid caused to circulate through a channel 9a in the roller 4a.

The resulting sheet of glass 1a' is entrained under drive from margin wheels 7 and tractor rollers 8. The wheels 7 and rollers 8 are implemented in pairs. The margin rollers 7 act only on the margins while the tractor rollers 8 act further downstream on the entire width once it has consolidated.

The apparatus shown does not include means for guiding the treated stream 1a'. In this context, such guidance means are superfluous.

The sheet of glass produced in this way presents two faces, $F_1$ and $F_2$, wherein at least one face has high surface quality (e.g. $F_1$, the face of the resulting sheet corresponding to face $s_1$ of the delivered stream 1a, which is free from any contact).

Figure 2:
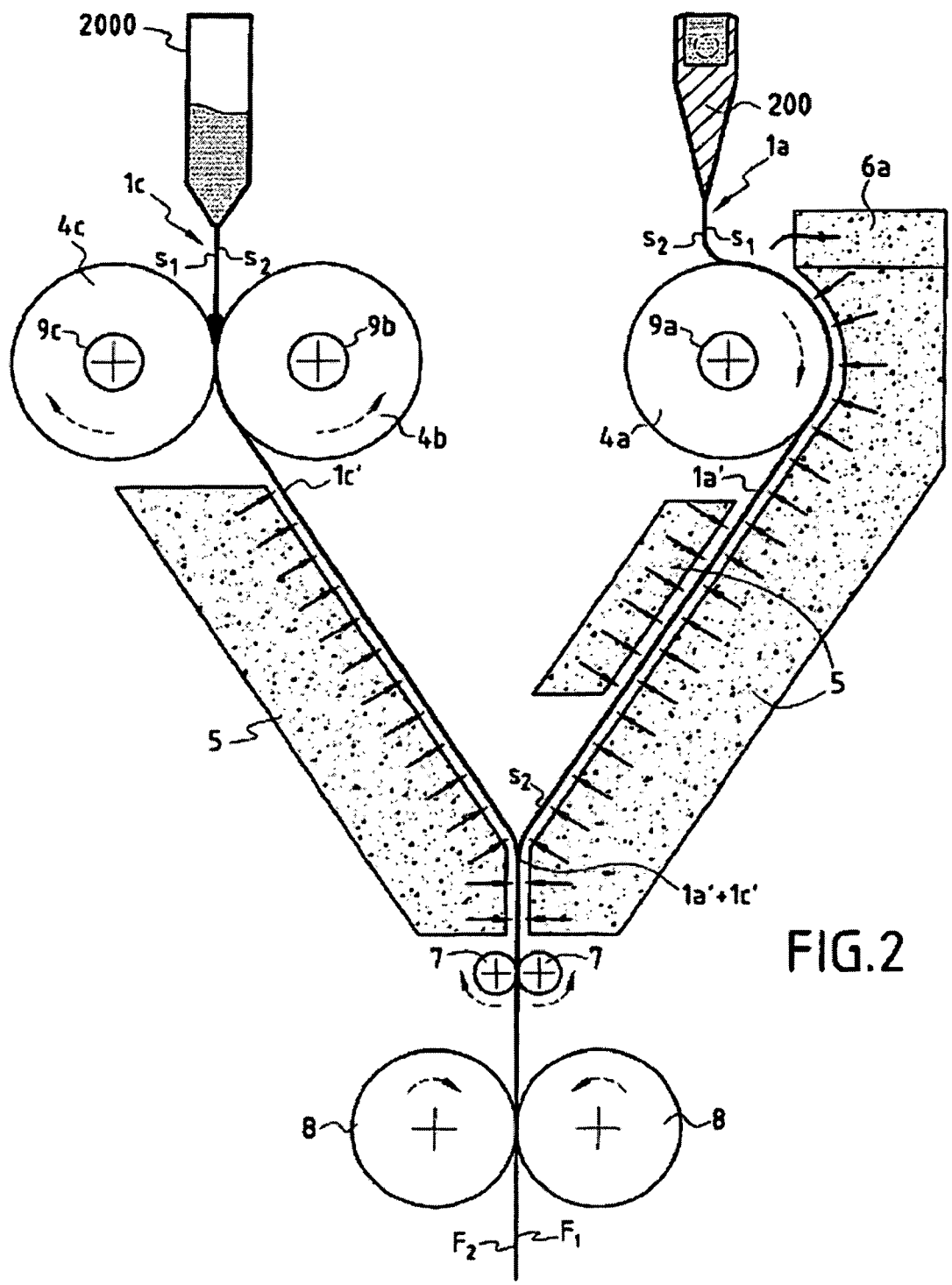
FIG. 2 is a section view of apparatus of the invention within which the method of the invention including the delivery of two streams of glass is implemented.

The right-hand side of FIG. 2 shows the apparatus of the invention as shown in FIG. 1 in association with means 5 for guiding the treated stream 1a'. The guidance of the treated stream 1a' is implemented without the faces $s_1$ and $s_2$ of the treated stream 1a' making contact with any surface whatsoever. The treated stream 1a' travels between two films of gas (in general two air cushions). The gas in question is delivered after passing through porous walls 5. It is exhausted from above at a wall 6a.

The guide means 5 also serve to guide a second treated stream 1c' and to join together the two treated streams 1a' and 1c'.

The second stream of glass 1c is delivered by delivery means 2000. It is then treated by being rolled between rollers 4b and 4c. Within respective channels 9b and 9c, the rollers 4b and 4c convey circulating cooling fluid.

The roller 4c is suitable for transferring an imprinted pattern onto the surface $s_1$ of the stream 1c.

A sheet of glass is thus produced having a face $F_1$ that presents high surface quality (the face $s_1$ of the delivered stream 1a and of the treated stream 1a' that is free from any contact), and another face $F_2$ that carries a pattern (face $s_1$ of the rolled stream 1c').

Figure 3:
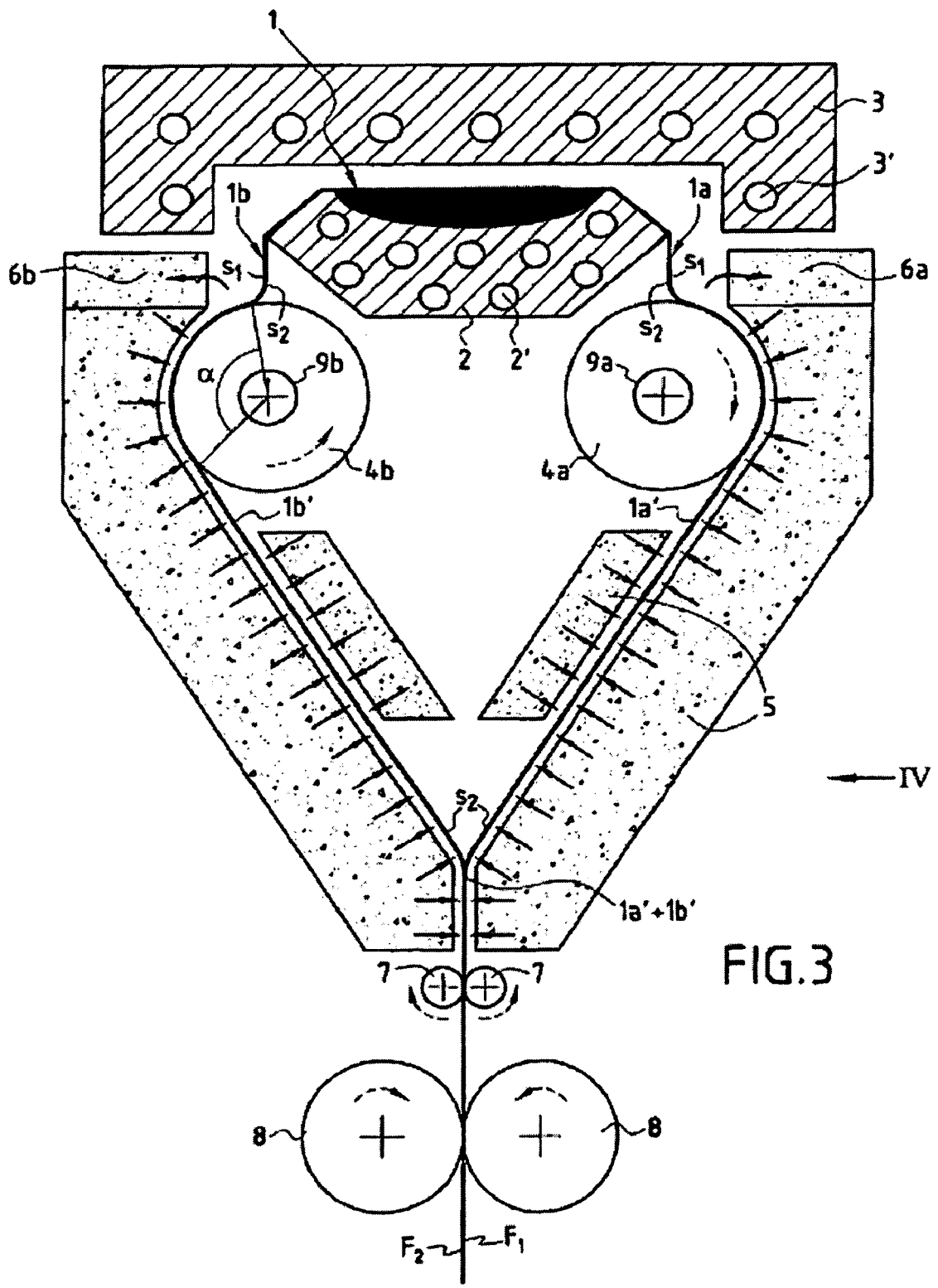
FIG. 3 is a section view of another apparatus of the invention within which the method of the invention including the delivery of two streams of glass is implemented.

FIG. 3 shows a mass 1 of molten glass in a delivery device 2 for delivering the molten glass in the form of two streams 1a and 1b. The streams 1a and 1b are delivered by overflowing.

The delivery device 2 is of the truncated isopipe type. Its structure has housings 2' suitable for receiving heating resistance elements. It is isolated from the outside by a muffler 3. The structure of the muffler 3 also contains housings 3' suitable for receiving heating resistance elements.

The streams of glass 1a and 1b fall freely through a short distance prior to being taken up respectively by forming rollers 4a and 4b. While falling freely, both faces $s_1$ and $s_2$ of the streams 1a and 1b are free from any contact with any surface whatsoever. On being taken up, the face $s_2$ of each of the streams 1a and 1b comes into contact with the outside surface of the corresponding roller. The forming rollers 4a and 4b turn in opposite directions in a direction and a speed such as to ensure there is no relative movement between either roller and the stream of glass in contact therewith. The contact or "wedging" angle of the glass on the roller 4b is referenced α. On the roller 4a, the contact angle is identical. The rollers 4a and 4b are used to stabilize the freely-falling streams 4a and 4b mechanically. These rollers deliver the treated streams of glass 1a' and 1b'. The viscosity of the streams 1a and 1b is increased, mainly by the contact between the stream and the roller which implies that the stream is cooled. This cooling is controlled by controlling the flow rate and the temperature of the cooling fluid caused to circulate in the channels 9a and 9b of the rollers 4a and 4b.

The treated streams 1a' and 1b' are then guided towards their junction zones. Guidance is implemented without the faces $s_1$ and $s_2$ of the treated streams making contact with any surface whatsoever. The treated streams 1a' and 1'b move between two films of gas (generally between air cushions). The gas in question is delivered after passing through porous walls 5. It is removed from the top level with walls 6a and 6b.

While the streams are being joined (implemented under the action of films of gas generated downstream of the junction line), the faces $S_2$ of the treated streams 1a' and 1b' are stuck together. The resulting sheet of glass is thus obtained with both faces (faces $s_1$ of the streams 1a, 1b, 1a', and 1b') that have been kept free from making contact with any surface whatsoever.

Figure 4:
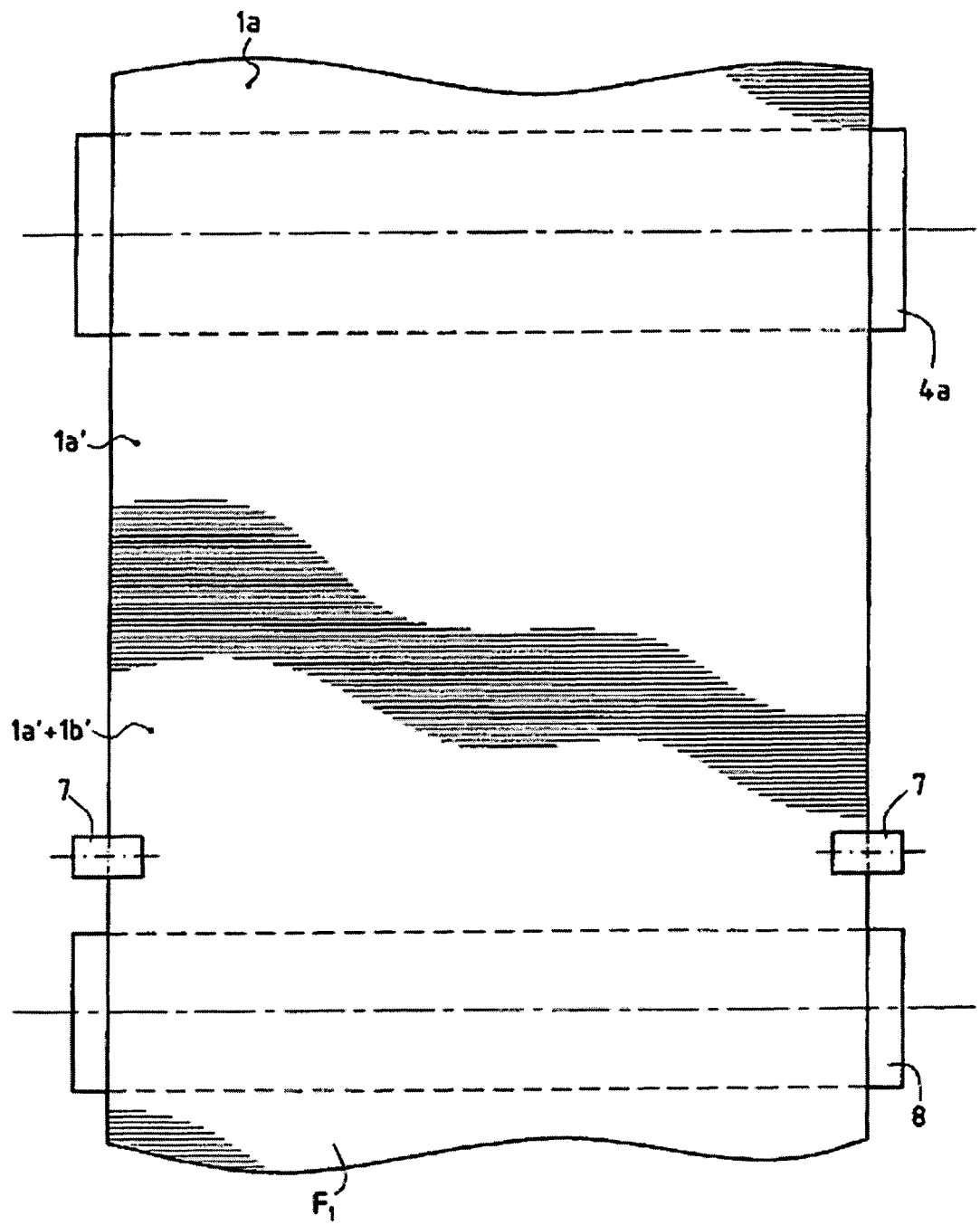
FIG. 4 is a simplified view on IV of the apparatus shown in FIG. 3.

The resulting sheet of glass is driven under drive from margin wheels 7 and tractor rollers 8. The wheels 7 and rollers 8 naturally operate in pairs. FIG. 4 shows clearly that the margin wheels 7 act only on the margins of the as yet unconsolidated sheet, which margins are recovered and recycled, whereas the tractor rollers 8 act on the entire width of the sheet once it has consolidated.

FIG. 4 shows more clearly the respective and successive actions of the forming roller 4a on the flowing stream of glass 1a, of the margin wheels 7, and of the tractor roller 8 on the stream of glass 1a' as it flows.

Figure 5A:
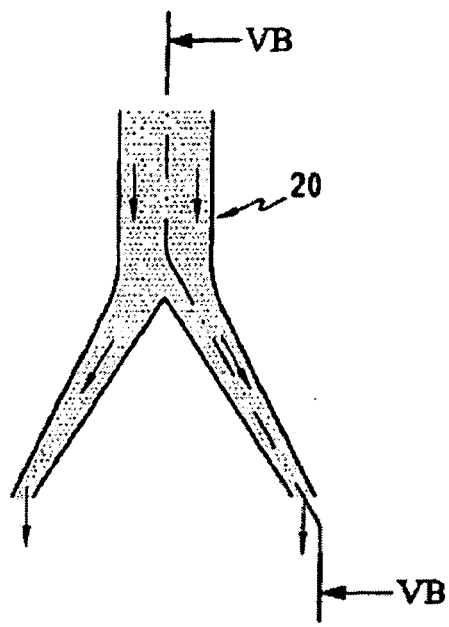
FIGS. 5A and 5B show a device or mechanism for delivering two streams of glass. The device or mechanism is different from those shown in FIG. 3.
Figure 5B:
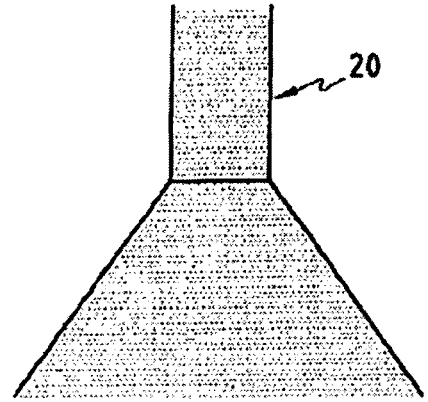
Figure 6:
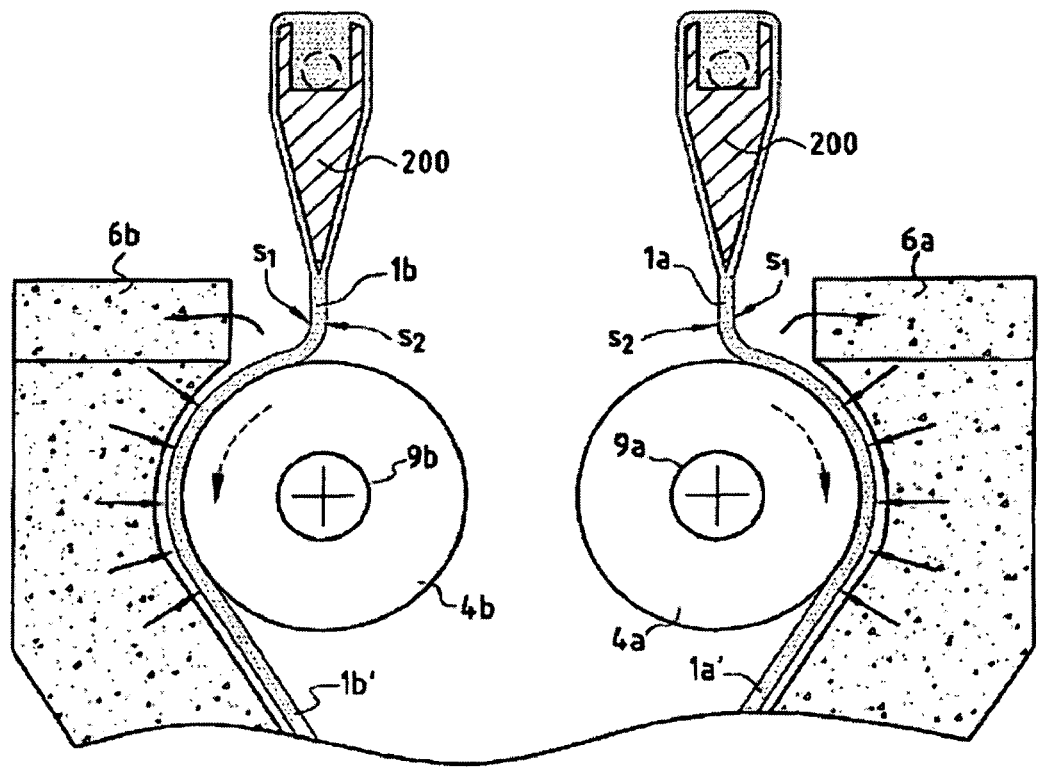
FIG. 6 is a section view through the top portion of another apparatus of the invention of the same type as that shown in FIG. 3, this other apparatus includes different devices or mechanisms for delivering the streams of glass.

FIGS. 5A, 5B, and 6 show respective means for delivering two streams of glass that are different from the device 2 shown in FIG. 3.

The device 20 shown in FIGS. 5A and 5B is constituted by pipework having two distinct open ends fitted with slots.

The device 200 shown in FIG. 6 has two independent isopipe type entities that are identical.

The apparatuses shown in FIGS. 3 to 6 are symmetrical about a vertical axis.

As stated above, the apparatus of the invention is not necessarily symmetrical. Similarly, it does not necessarily have a vertical outlet axis.

Figure 7:
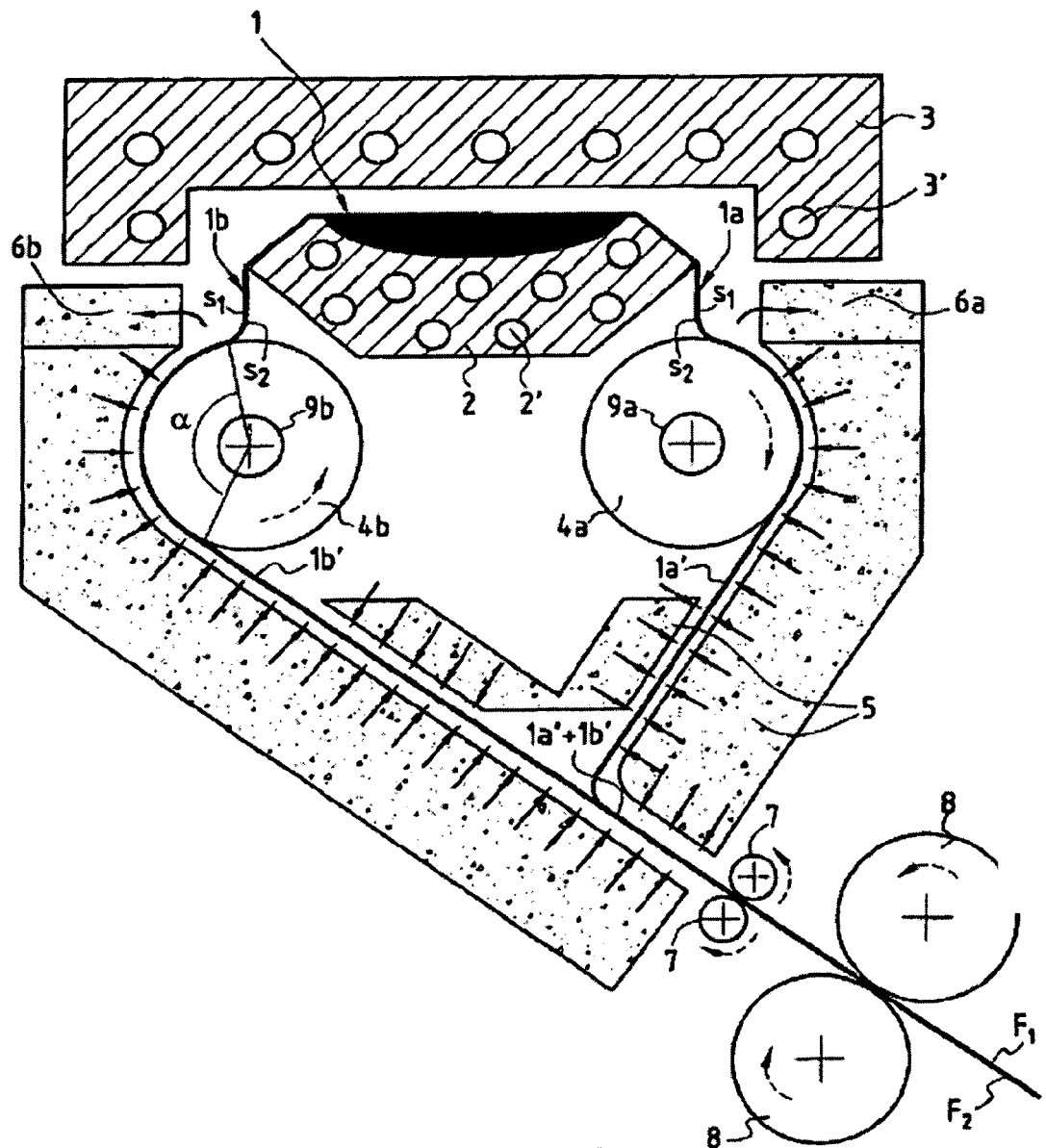
FIG. 7 is a section view of another apparatus of the invention of the same type as that shown in FIG. 3, but arranged differently.

FIG. 7 shows apparatus of the invention of the same type as that shown in FIG. 3, but in which the apparatus is asymmetrical, having an outlet axis that is not vertical.

Figure 8:
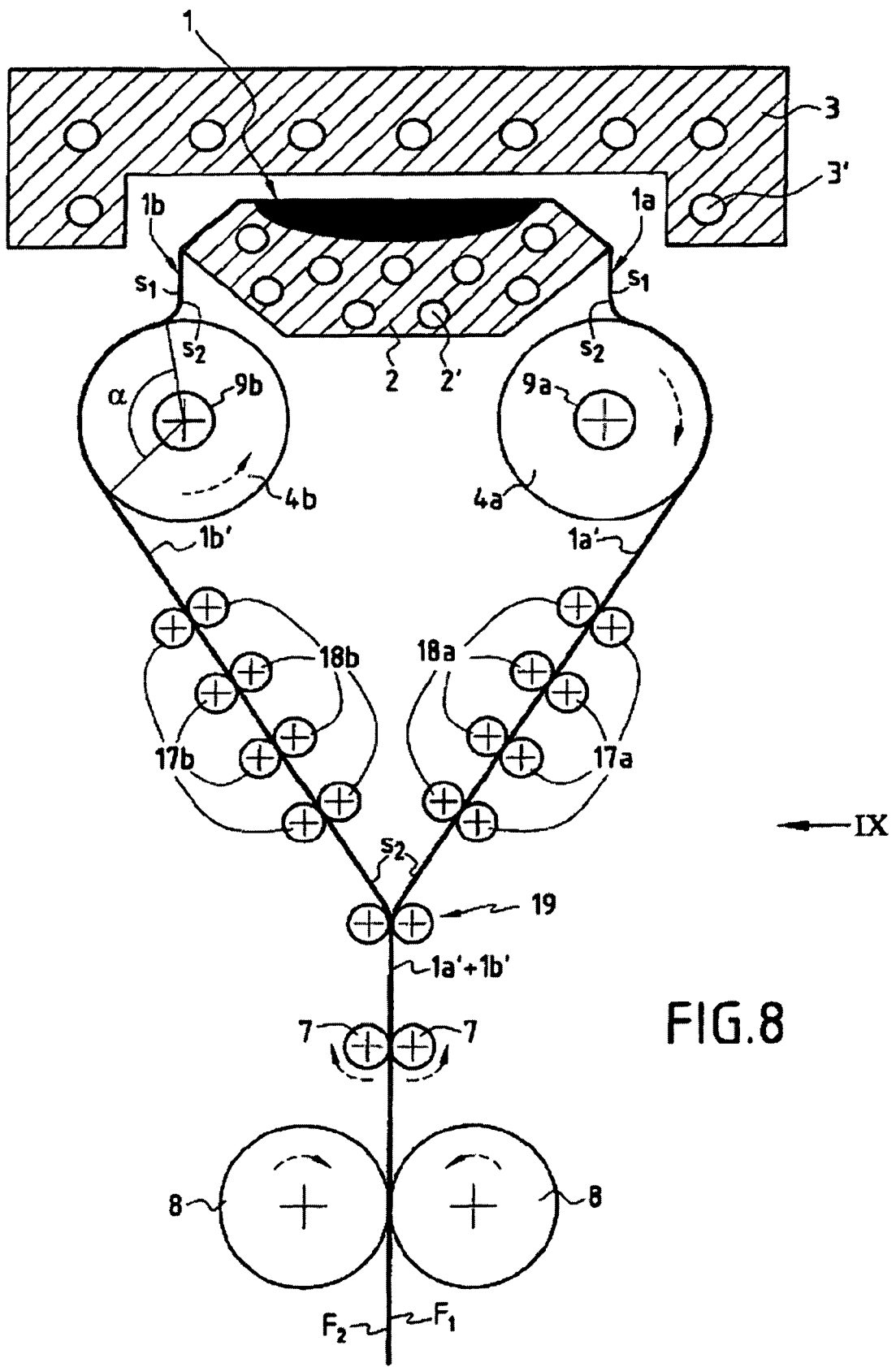
FIG. 8 is a section view of another apparatus of the invention within which the method of the invention including delivery of two streams of glass is implemented.
Figure 9:
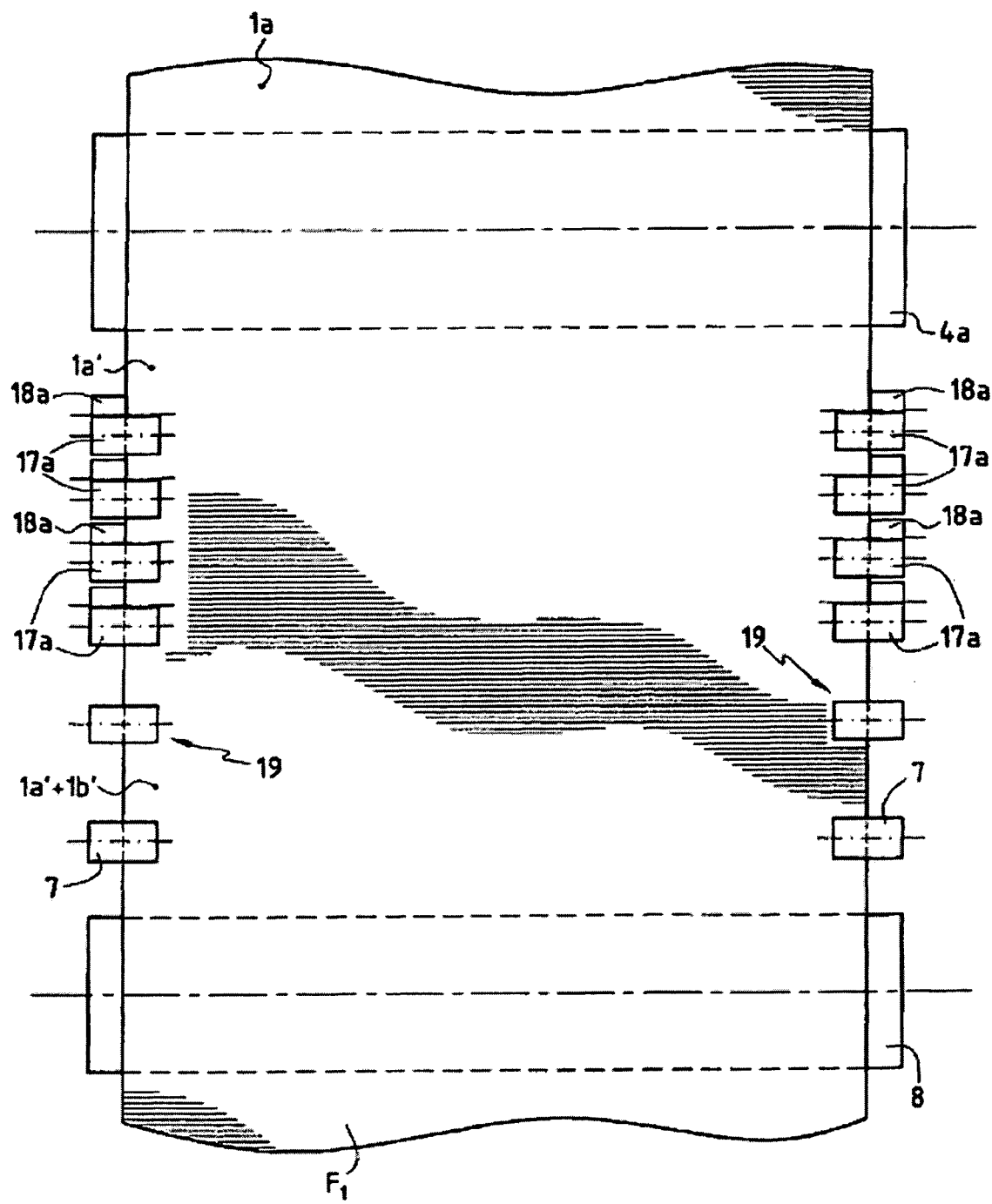
FIG. 9 is a simplified view on IX of the apparatus of the invention.

The apparatus shown in FIGS. 8 and 9 differs from that shown in FIGS. 3 to 7 in the nature of its guidance means and of its means for joining the two treated streams 1a' and 1b'. The guidance means (rollers) act in couples 17a; 17b on the margins of the streams of glass in question (beneath the streams), and they act in facing pairs 17a, 18a; 17b, 18b on opposite sides of each of the streams of glass. The couples and pairs can be seen clearly in FIGS. 8 and 9.

Reference 19 shows two rollers of the same type acting to join together the two treated (and guided) streams 1a' and 1b'.

The rollers 17a, 18a; 17b; 18b; 19 in question are narrow and act only on the margins of the sheets of glass 1a'; 1b' that are as yet not completely consolidated (FIG. 9).

The sheets of glass produced by the apparatus of FIGS. 3 to 8 have both faces $F_1$ and $F_2$ presenting high surface quality (at least the central portion thereof has remained free from any contact).

The treatment of the streams of glass 1a and 1b is performed without their faces $s_1$ coming into contact with any surface whatsoever (guidance by film(s) of gas) or else with their faces $s_1$ making practically no contact with any surface whatsoever (guidance by rollers).

Figure 10:
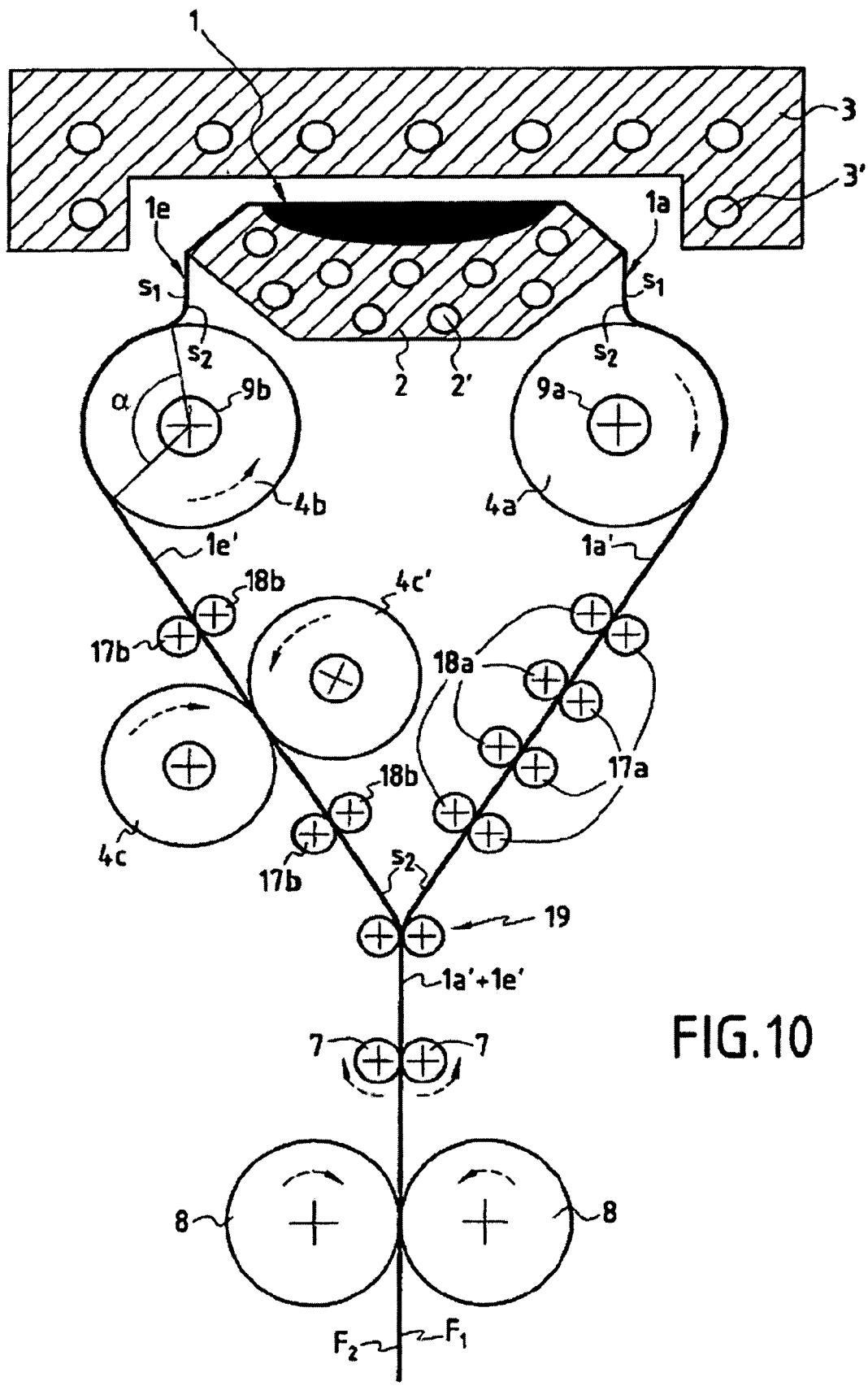
FIG. 10 is a section view of another apparatus of the invention of the same type as that shown in FIGS. 8 and 9.

FIG. 10 shows apparatus of the invention of the same type as that shown in FIGS. 8 and 9. This apparatus comprises in addition to: delivery means 2 for delivering two streams of glass 1a and 1e; treatment means 4a and 4b for treating said two delivered streams of glass 1a and 1e; respective guidance means 17a, 18a and 17b, 18b for guiding said treated streams of glass 1a' and 1e'; junction means 19 for joining said two treated streams of glass 1a' and 1e', and drive means 7 and 8 for driving the two joined-together streams 1a'+1e', means 4c and 4c' (means of the imprinting roller type) for transmitting an imprinted pattern to the face $s_1$ of the treated stream 1e'.

The sheet of glass produced by the apparatus of FIG. 10 has one face $F_1$ (face $s_1$ of the treated stream 1a' that makes practically no contact) presenting very high surface quality, and an opposite face $F_2$ (face $s_1$ of the treated stream 1e' which has been imprinted) that presents a pattern.

It will be understood that the imprint transferring device 4c+4c' can easily be used when required to produce sheets having a pattern on one face in apparatus of the type shown in FIGS. 8 and 9 and designed mainly for producing sheets having both faces with high surface quality.

Figure 11:
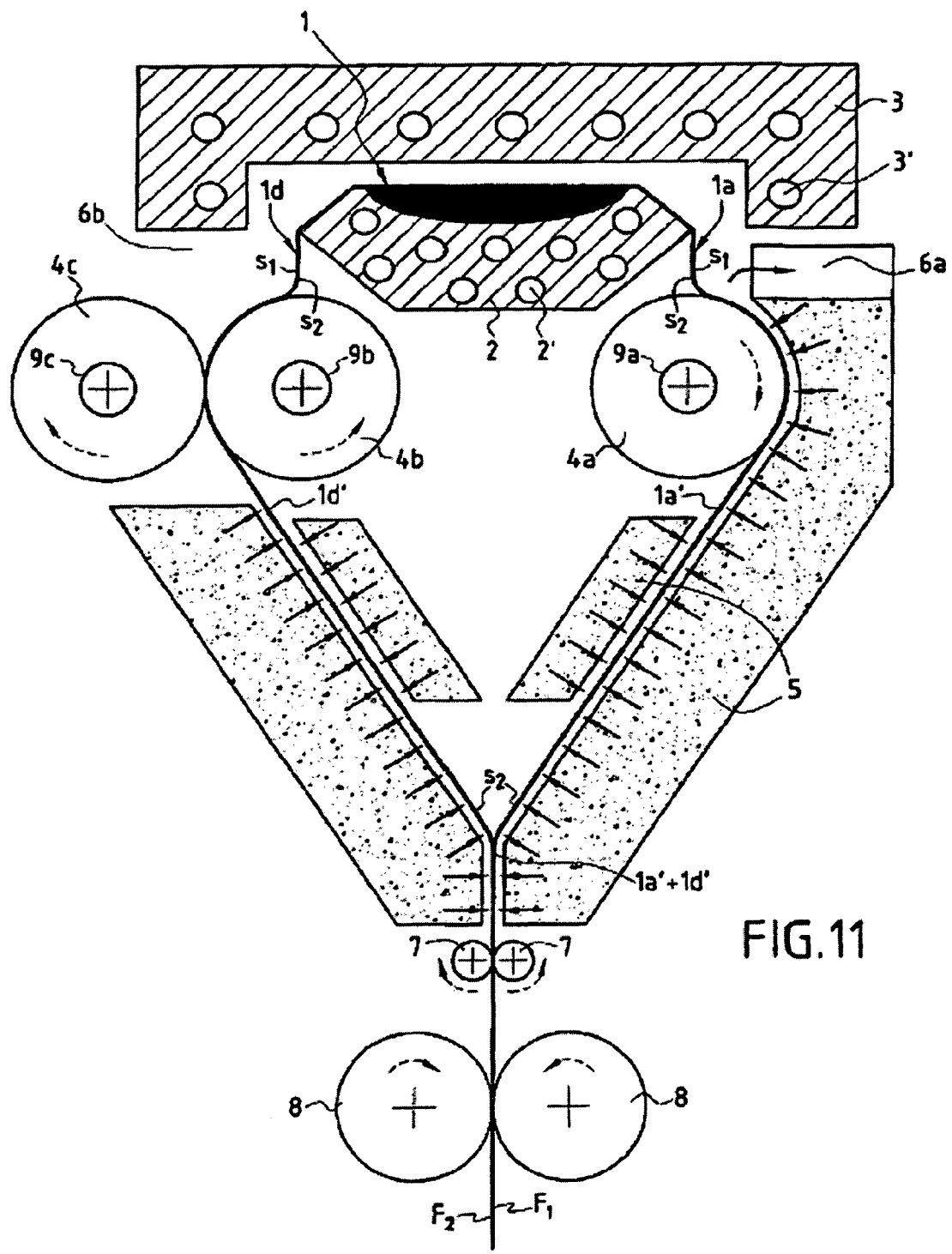
FIG. 11 is a section view of another apparatus of the invention of the same type as that shown in FIGS. 3 to 7.

FIG. 11 shows apparatus of the invention of the same type as that shown in FIGS. 3 to 6. This apparatus comprises in addition to: delivery means 2 for delivering two streams of glass 1a and 1d; treatment means 4a and 4b for treating said two delivered streams of glass 1a and 1d; guidance means 5 for guiding the two treated streams of glass 1a' and 1d'; junction means 5 for joining together said two treated streams of glass 1a' and 1d' together with drive means 7 and 8 for driving the two joined-together streams of glass 1a'+1d'; means 4c suitable for co-operating with the treatment means 4b for treating the stream 1d so as to transfer a pattern onto the face $s_1$ of said stream 1d, which means 4c is constituted by a roller.

The sheet of glass produced by the apparatus of FIG. 11 has one face $F_1$ (face $s_1$ of the treated stream 1a' that makes no contact) which presents high surface quality, while its opposite face $F_2$ (face $s_1$ of the treated stream 1d' onto which a patter is imprinted) which presents a pattern.

The present invention has been described both in general and in detail by way of examples. Persons skilled in the art will understand that the invention is not limited necessarily to the specific embodiments disclosed. Modifications and variations can be made without departing from the scope of the invention as defined by the following claims or their equivalents, including equivalent components presently known, or to be developed, which can be used within the scope of the present invention. Hence, unless changes otherwise depart from the scope of the invention, the changes should be construed as being included herein.

Although several embodiments of the present invention have been described in the detailed description, it should be understood that the invention is not limited to the embodiments disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the compositions, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

In a first example, glass of the alkali-lime type is delivered via two slots formed at the end of a casting tube (see FIG. 5A). Said tube is made out of platinum alloy. Each of the slots presents a width of 520 mm. The glass is delivered with viscosity of 250 poises at a temperature of about 1340° C.

Each delivered flow of glass drops through 10 mm before being received on a stainless steel forming roller having a diameter of 80 mm that is maintained at 550° C.

Each of the forming rollers is driven at a speed of 5.8 revolutions per minute (rpm). The contact angle of the glass on each of said rollers is about 120°.

Each sheet of glass leaves the corresponding forming roller with viscosity of about 50,000 poises and at a temperature of about 950° C.

It is then guided between two cushions of nitrogen to the point where the two sheets are joined together. The nitrogen is delivered through porous graphite. A heater device formed within said graphite enables each of the two sheets to be maintained essentially isothermally as it passes between the cushions of nitrogen.

A train of margin wheels acts downstream from the junction point, followed by a train of tractor rollers (downstream from said train of margin wheels). Said trains stretch the sheet by 35%.

The zone downstream from said junction point in which said trains of margin wheels and of tractor rollers act is provided with temperature-regulated walls so that the final cooling of the sheet of glass is controlled.

This produces a sheet of glass having excellent surface quality at a speed of 2 meters per minute (m/min). Said sheet of glass is 2.6 mm thick and has a usable width of 450 mm.

This usable width of 450 mm corresponds to the initial 520 mm (width of the delivery slot) from which it has been necessary to remove a few millimeters because of the unavoidable phenomenon of attenuation and because of the two margin strips that have been worked by the margin wheels. These margin strips constitute scrap and they are conventionally recycled to the upstream end of the process.

Example 2

In a second example, a unicrown glass composition having a viscosity of 200 Pa·s (T=1,150° C.), 3 mm thick, 100 mm in width was delivered to a stainless steel roll having an internal diameter of approximately 70 mm and an external diameter of about 100 mm, a length of about 140 mm, a rotation speed of about 2.5 rotations per minute, and an internal air flow of about 50 m$^3$/h.

The glass composition also has a flow density of about 200 kg/h/m (11.25 lb/hr·inch). The flow of glass was centered on the stainless steel role and contacted on one quarter of one turn. In this example, a drawing force greater than about 100 N/m could have been applied without causing slippage between the roll and the glass. The temporary (reversible) adhesion under these circumstances would be sufficient to produce a desirable glass sheet, as drawing forces typically used in the industry are in the range of about 100N/m. The specific range of desirable adhesion forces can vary, depending upon the length of the contact area between the roller and the glass, and the pulling force exerted on the glass.

The temperature of the glass/roller interface can determine, in part, the adhesive forces between the glass and the roller. The temperature on the center of the roll (20 mm before the contact area of the glass on the roll) was then determined using an infrared pyrometer. For a temperature less than 580° C., the glass slips onto the roller and a flow is not stabilized. For a temperature greater than 620° C., the glass irreversibly stuck to the roller and could not be drawn. For a temperature of about 600° C., the drawing force was applied and the contact release between the glass and the roller occurred naturally.

Thermocouples installed inside the stainless steel roll, positioned 5 mm under the surface, indicated that the temperature variation amplitudes were close to 50° C. during each rotation. This degree of variation is correlated to the extent of cooling applied to the interface in order to bring the adhesive force from its initial value to zero, before the contact release.

Various modifications and variations can be made to the compositions, articles, devices, and methods described herein. Other embodiments of the compositions, articles, devices, and methods described herein will be apparent from consideration of the specification and practice of the compositions, articles, devices, and methods disclosed herein. It is intended that the specification and examples be considered as exemplary.

What is claimed is:

1. A method of producing sheets of glass having two faces with at least one of said faces presenting a high surface quality, the method comprising:
   (a) delivering a first stream of glass having a viscosity in the range of about 100 poises to 10,000 poises, said stream of glass having a first face and second face, each face is free from making contact with any surface and thus possibly being destabilized mechanically;
   (b) treating said delivered stream of glass prior to destabilization by putting a first face into contact with a surface of a treatment device suitable, temporarily, to support the weight of said stream of glass and for accompanying the falling movement of said stream of glass while controlling the interfacial temperature between the stream of glass and the surface of the treatment device thereby, temporarily, creating a controllable reversible interfacial adhesion force between the stream of glass and the surface that is sufficient to prevent a slippage of the stream of glass with respect to the surface in order to stabilize the stream glass and increasing the viscosity of the stream of glass to a range from about $10^9$ poise to about $10^{11}$ poise, while maintaining at least a central strip of said second face free from any contact with any surface;

(c) using a device or mechanism for controlling glass travel speed to act on the delivered stream after treating, at a suitable distance downstream to provide a sheet of glass; and (d) cooling said sheet of glass;

(e) wherein the treating step comprises controlling the interfacial temperature using the following equation:

$$\frac{T_{1S}(t) - T_{2S}(t)}{T_1 - T_2} = \exp\left(\frac{t}{\tau}\right) \times \mathit{erfc}\left(\sqrt{\frac{t}{\tau}}\right) \text{ where } \tau = \left(\frac{b_1 b_2}{h_i(b_1 + b_2)}\right)^2$$

wherein T1$s$(t) is the temperature of a first material at the interface over time (t), wherein T2$s$(t) is the temperature of a second material at the interface over time (t), hi is the interfacial heat transfer coefficient (W/m2·K), b1 is (λ·p·cp)½ for the materials, λ is the thermal conductivity of the material (W/m·K), p is the density of the material (kg/m3), cp is the heat capacity of the material (J/kg·K).

2. The method according to claim 1, wherein step (b) of treating said delivered stream of glass comprises controlling the temperature of at least a portion of the surface.

3. The method according to claim 2, wherein the temperature of at least a portion of the surface is controlled to be from about 580° C. to about 620° C.

4. The method according to claim 1, wherein said method further comprises:
   (e) delivering a second stream of glass compatible with the first stream of glass; said second stream of glass having a viscosity in the range of about 100 poises to 10,000 poises, a first face and second face, both of said faces being free from contact with any surface, thus possibly being destabilized mechanically;
   b. (f) treating said second stream of glass prior to destabilization by putting a first face of the second stream of glass into contact with a surface of a second treatment device suitable, temporarily, to support the weight of said second stream of glass and for accompanying the falling movement of said second stream of glass while controlling the interfacial temperature between the second stream of glass and the surface of the second treatment device thereby, temporarily, creating a controllable reversible interfacial adhesion force between the second stream of stream of glass and the surface of the second treatment device that is sufficient to prevent a slippage of the stream of glass with respect to the surface in order to mechanically stabilize the second stream of glass and increase the viscosity of the second, stream of glass to a range from about $10^9$ poise to about $10^{11}$ poise;
   c. (g) guiding the first and second treated streams of glass towards a junction zone; said guidance of said first treated stream being provided while ensuring that at least the central strip of said second face of said first treated stream of glass that has been kept free from making contact with any surface continues to be kept free from any such contact;
   d. (h) joining said first and second treated and guided streams; the streams being joined via the first face of said first treated stream of glass that has come into contact upstream with said treatment device or mechanism, while said second face of said first treated stream of glass remains relatively free from any contact with any surface whatsoever; and wherein an action of said device or mechanism suitable for controlling the travel speed and the width and the thickness of the sheet of glass is applied to said two joined-together streams of glass.

5. The method according to claim 4, wherein step (f) of treating said treatment of said second delivered stream of glass comprises treatment with or without transferring an imprint.

6. The method according to claim 4, wherein the step of treating the second stream of glass comprises maintaining at least the central strip of the second face of the second stream of glass free from contact with any surface whatsoever; and
   the step of guiding the second stream of glass comprises ensuring that at least the central strip of the second face of the second stream of glass that has been kept free from contact with any surface whatsoever continues to be kept free from any such contact.

7. The method according to claim 6, transferring an imprint onto the second face of the second stream of glass.

8. The method according to claim 4, wherein the step of delivering the first stream of glass comprises delivering the first stream of such that the first stream of glass drops under the force of gravity to the surface of the treatment device for a distance that does not exceed 150 mm.

9. The method according to claim 8, wherein the step of delivering the first stream of glass comprises delivering the first stream of glass such that the first stream of glass drops under the force of gravity to the surface of the treatment device for a distance that does not exceed 60 mm.

10. The method according to claim 1, wherein the step of delivering the first stream of glass comprises delivering the first stream of glass such that the first stream of glass drops under the force of gravity to the surface of the treatment device a distance that does not exceed 150 mm.

11. The method according to claim 10, wherein the step of delivering, the first stream of glass comprises delivering the first stream of glass that the first stream of glass drops under the force of gravity to the surface of the treatment device for a distance that does not exceed 60 mm.

12. An apparatus for producing a sheet of glass having two faces, wherein, at least one of the two faces has a high surface quality, the apparatus, from upstream to downstream, comprising:
   a. a delivery device capable of delivering a first stream, of glass having a viscosity in the range of about 100 poises to 10,000 poises under conditions in which the first stream of glass has a first face and an opposing second face, both of which are free from any contact with any surface whatsoever;
   b. a treatment device capable of treating the stream of glass after delivery, the device having a surface being suitable for being put into contact with the first face of the stream of glass and for supporting the weight of the stream of glass at least temporarily while accompanying a falling movement thereof while controlling the interfacial temperature between the second stream of glass and the surface of the second treatment device thereby temporarily creating a controlled reversible interfacial adhesion force between the second stream of stream of glass and the surface of the second treatment device that is sufficient to prevent a slippage of the stream of glass with respect to the surface and increasing a viscosity of the stream of glass to a range from about $10^9$ poise to about $10^{11}$ poise, while maintaining at least a central strip of the second face free from any contact with any surface whatsoever;
   c. the relative disposition, of the delivery device and the treatment device being compatible with the mechanical stability of the delivered stream of glass;

d. a controller located at a suitable position downstream for controlling at least one of the travel speed, width, and thickness of a resulting sheet of glass; and
e. a cooling zone for cooling the resulting sheet of glass;
f. wherein the treatment device comprises a means for controlling the temperature of at least a portion of the surface thereof, and wherein the means for controlling the temperature is programmed to control the temperature of at least a portion of the surface of the treatment device by the following equation:

$$\frac{T_{1S}(t) - T_{2S}(t)}{T_1 - T_2} = \exp\left(\frac{t}{\tau}\right) \times erfc\left(\sqrt{\frac{t}{\tau}}\right) \text{ where } \tau = \left(\frac{b_1 b_2}{h_i(b_1 + b_2)}\right)^2$$

wherein T1s(t) is the temperature of a first material at the interface over time (t), wherein T2s(t) is the temperature of a second material at the interface over time (t), hi is the interfacial heat transfer coefficient (W/m2·K), b1 is (λ·p·cp)½ for the materials, λ is the thermal conductivity of the material (W/m·K), p is the density of the material (kg/m3), cp is the heat capacity of the material (J/kg·K).

13. The apparatus of claim 12, wherein the means for controlling the temperature of at least a portion of the surface thereof comprises at least one of a fluid circulation circuit, a cooling channel, a cooling nozzle, or a combination thereof.

14. The apparatus of claim 12, wherein at least a portion of the surface of the treatment device is capable of being maintained at a predetermined temperature.

15. The apparatus of claim 12, wherein the treatment device comprises a roller comprising at least one of a refractory material, a metal alloy, or a combination thereof.

16. The apparatus of claim 15, wherein the roller is located below the delivery device by a distance that does not exceed 150 mm.

17. The apparatus of claim 16, wherein the roller is located below the delivery device by a distance that does not exceed 60 mm.

18. The apparatus of claim 12, wherein the treatment device is located below the delivery device by a distance that does not exceed 150 mm.

19. The apparatus of claim 18, wherein the treatment device is located below the delivery device by a distance that does not exceed 60 mm.

* * * * *